US012597375B2

(12) United States Patent
Kim et al.

(10) Patent No.: US 12,597,375 B2
(45) Date of Patent: Apr. 7, 2026

(54) APPARATUS FOR SENSING STRETCH HAVING DRIVING AND RECEIVING ELECTRODES EXTENDING IN TWO DIRECTIONS

(71) Applicant: LG Display Co., Ltd., Seoul (KR)

(72) Inventors: JuHan Kim, Paju-si (KR); Jinseong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/902,439

(22) Filed: Sep. 30, 2024

(65) Prior Publication Data

US 2025/0265956 A1 Aug. 21, 2025

(30) Foreign Application Priority Data

Feb. 15, 2024 (KR) ........................ 10-2024-0021879

(51) Int. Cl.
*G09G 3/00* (2006.01)
*G09G 3/32* (2016.01)

(52) U.S. Cl.
CPC ............... *G09G 3/035* (2020.08); *G09G 3/32* (2013.01); *G09G 2300/0842* (2013.01); *G09G 2310/0286* (2013.01); *G09G 2310/0291* (2013.01)

(58) Field of Classification Search
CPC ...................................................... G09G 3/035
USPC .......................................................... 345/204
See application file for complete search history.

(56) References Cited

U.S. PATENT DOCUMENTS

2019/0179445 A1* 6/2019 Moon .................. G09G 3/2003
2023/0168780 A1* 6/2023 Lee ..................... G06F 3/04164 345/174
2023/0214077 A1* 7/2023 Kim ...................... G06F 3/0448 345/173

FOREIGN PATENT DOCUMENTS

KR 10-2018-0000665 A 1/2018
KR 10-2018-0031896 A 3/2018

* cited by examiner

*Primary Examiner* — Long D Pham
(74) *Attorney, Agent, or Firm* — Birch, Stewart, Kolasch & Birch, LLP

(57) ABSTRACT

An apparatus for sensing a stretch can be provided with three different types of stretch electrodes to determine the presence or absence of a stretch. The apparatus for sensing a stretch can include a stretch support substrate configured to be stretched; and a plurality of driving electrodes, a plurality of mono-receiving electrodes, and a plurality of cross-receiving electrodes provided on the stretch support substrate. Each of the plurality of driving electrodes includes a first direction driving electrode extending in a first direction of the stretch support substrate, and a plurality of second direction driving electrodes connected to the first direction driving electrode and extending in a second direction different from the first direction. Each of the plurality of mono-receiving electrodes extends in the second direction, and each of the cross-receiving electrodes extends in the first direction and the second direction.

19 Claims, 15 Drawing Sheets

APPARATUS FOR SENSING STRETCH HAVING DRIVING AND RECEIVING ELECTRODES EXTENDING IN TWO DIRECTIONS

CROSS-REFERENCE TO RELATED APPLICATIONS

This application claims priority to Korean Patent Application No. 10-2024-0021879 filed in the Republic of Korea, on Feb. 15, 2024, the entire contents of which is hereby expressly incorporated by reference into the present application.

BACKGROUND

Field of Technology

The present disclosure relates to an apparatus for sensing a stretch.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images.

Light emitting display apparatuses are used for various purposes in various fields, and recently, there is a demand to check the degree of stretch of a light emitting display apparatus and the stretch coordinates of a light emitting display apparatus. For example, an apparatus for sensing a stretch, which is capable of displaying an image and sensing a stretch, is in demand.

However, an apparatus for sensing a stretch, which is capable of meeting these various requirements, is not available.

The above-described background is part of the present disclosure to devise the present disclosure or is technical information acquired by a process of devising the present disclosure, but cannot be regarded as the known art disclosed to the general public before the present disclosure is disclosed.

SUMMARY OF THE DISCLOSURE

Accordingly, the present disclosure is directed to providing an apparatus for sensing a stretch, which substantially obviates one or more problems due to limitations and disadvantages of the related art.

An aspect of the present disclosure is directed to providing an apparatus for sensing a stretch, which is provided with three different types of stretch electrodes to determine the presence or absence of stretch.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided an apparatus for sensing a stretch comprising: a stretch support substrate configured to stretch; and a plurality of driving electrodes, a plurality of mono-receiving electrodes, and a plurality of cross-receiving electrodes provided on the stretch support substrate, wherein each of the plurality of driving electrodes includes a first direction driving electrode extending in a first direction of the stretch support substrate and a plurality of second direction driving electrodes connected to the first direction driving electrode and extending in a second direction different from the first direction, each of the plurality of mono-receiving electrodes extends in the second direction, and each of the plurality of cross-receiving electrodes extends in the first direction and the second direction.

It is to be understood that both the foregoing general description and the following detailed description of the present disclosure are example and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
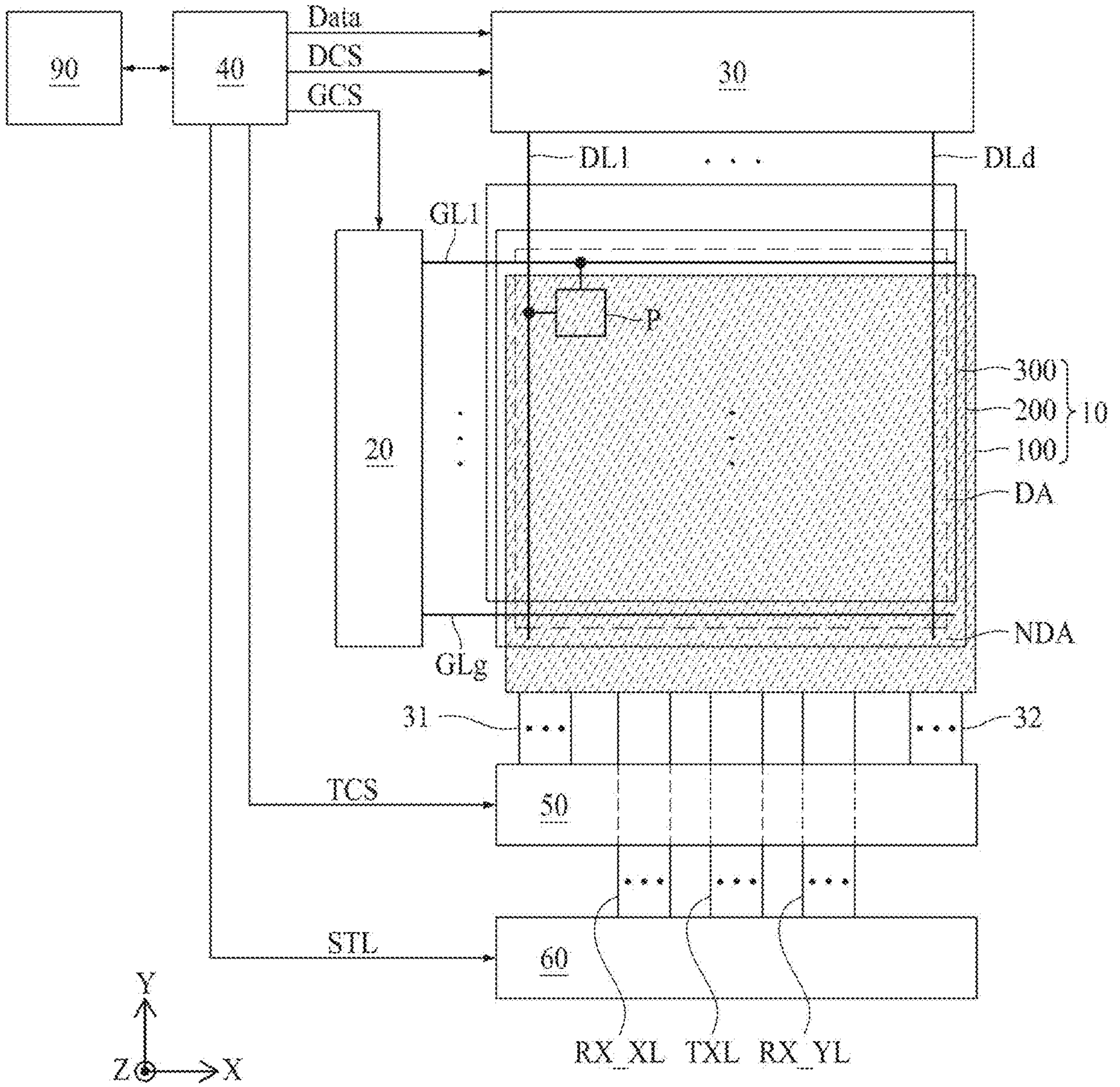
FIG. 1 is an example diagram illustrating a configuration of an apparatus for sensing a stretch according to an embodiment of the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct (ly)" is used.

In describing a time relationship, for example, when the temporal order is described as, for example, "after," "subsequent," "next," and "before," a case that is not continuous can be included unless a more limiting term, such as "just," "immediate (ly)," or "direct (ly)" is used.

It will be understood that, although the terms "first," "second," etc. can be used herein to describe various elements, these elements should not be limited by these terms. These terms are only used to distinguish one element from another and may not define order or sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. As for the expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. Further, the term "can" used herein includes all meanings and definitions of the word "may."

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. All the components of each apparatus according to all embodiments of the present disclosure are operatively coupled and configured.

Figure 2:
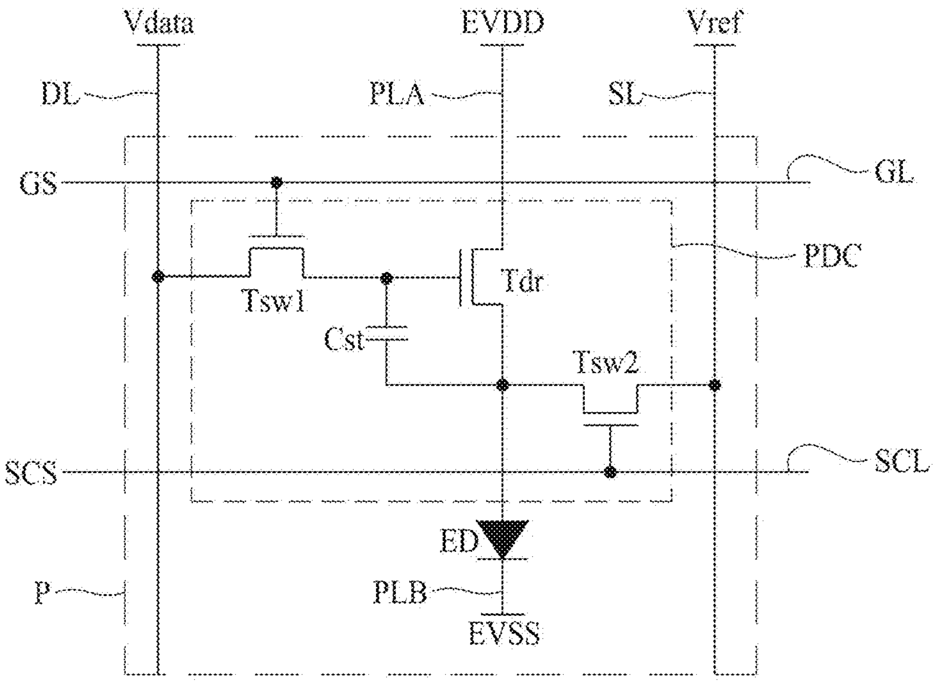
FIG. 2 is an example diagram illustrating a structure of a pixel applied to an apparatus for sensing a stretch according to an embodiment of the present disclosure.
Figure 3:
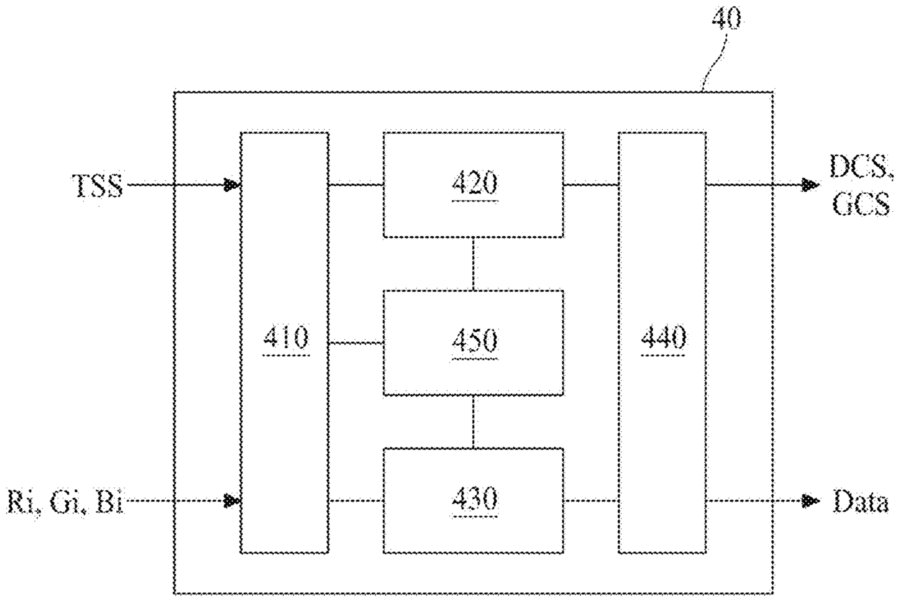
FIG. 3 is an example diagram illustrating a structure of a control driver applied to an apparatus for sensing a stretch according to an embodiment of the present disclosure.
Figure 4:
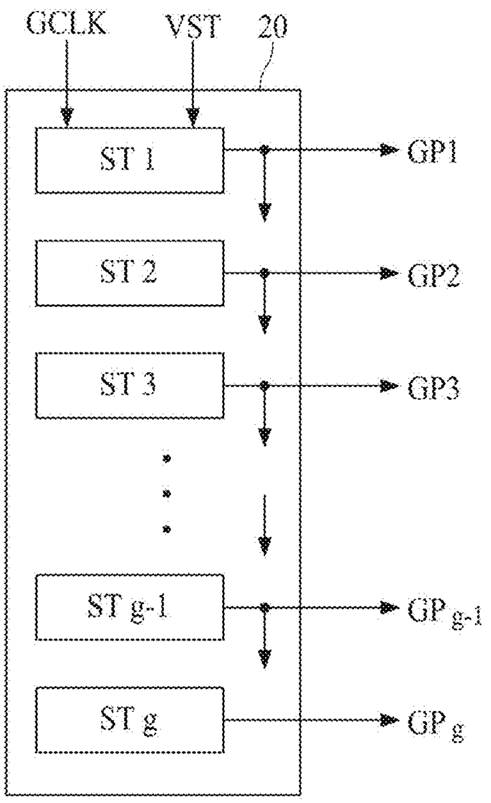
FIG. 4 is an example diagram illustrating a structure of a gate driver applied to an apparatus for sensing a stretch according to an embodiment of the present disclosure.
Figure 5:
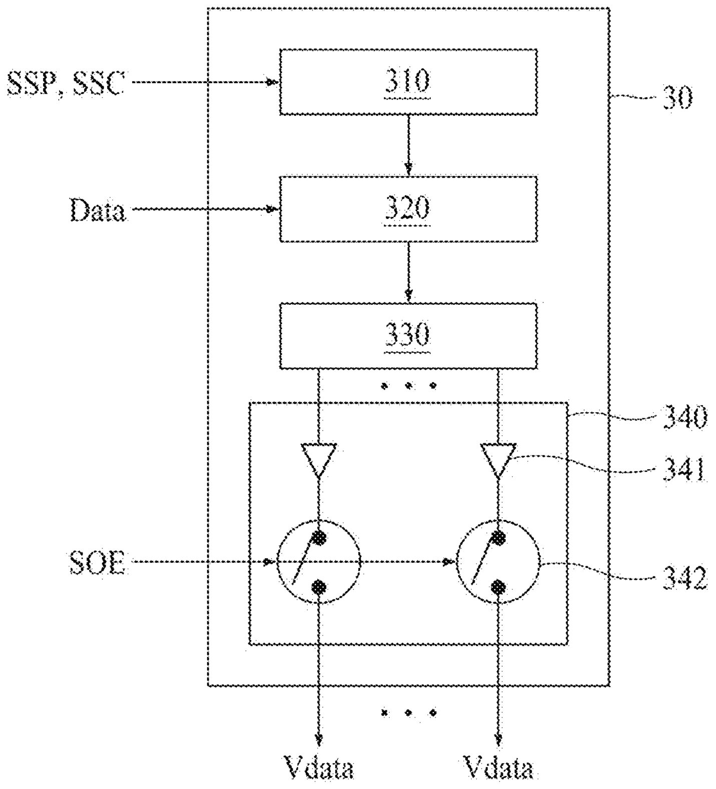
FIG. 5 is an example diagram illustrating a structure of a data driver applied to an apparatus for sensing a stretch according to an embodiment of the present disclosure.

FIG. 1 is an example diagram illustrating a configuration of an apparatus for sensing a stretch according to an embodiment of the present disclosure, FIG. 2 is an example diagram illustrating a structure of a pixel applied to an apparatus for sensing a stretch according to an embodiment of the present disclosure, FIG. 3 is an example diagram illustrating a structure of a control driver applied to an apparatus for sensing a stretch according to an embodiment of the present disclosure, FIG. 4 is an example diagram illustrating a structure of a gate driver applied to an apparatus for sensing a stretch according to an embodiment of the present disclosure, and FIG. 5 is an example diagram illustrating a structure of a data driver applied to an apparatus for sensing a stretch according to an embodiment of the present disclosure.

An apparatus for sensing a stretch according to an embodiment of the present disclosure can be used as various kinds of electronic devices. Electronic device can be, for example, a wearable device worn on a user's body. In particular, a wearable device can be worn on a user's wrist, knee, and elbow.

An apparatus for sensing a stretch according to an embodiment of the present disclosure, as illustrated in FIG. 1, can include a light emitting display panel 10 which includes a display area DA (or active area) displaying an image and a non-display area NDA (or non-active area) provided outside the display area DA, a gate driver 20 which supplies gate signals GS to a plurality of gate lines GL1 to GLg provided in the display area DA of the light emitting display panel 10, a data driver 30 which supplies data voltages Vdata to a plurality of data lines DL1 to DLd provided in the display area DA of the light emitting display panel 10, a touch driver 50 which supplies a touch driving signal to a touch electrode provided in the light emitting display panel 10, a stretch driver 60 which supplies a stretch driving signal to a stretch electrode provided in the light emitting display panel 10, a control driver 40 which controls driving of the gate driver 20, the data driver 30, the touch driver 50, and the stretch driver 60, and a power supply unit which supplies power to the control driver 40, the gate driver 20, the data driver 30, the touch driver 50, the stretch driver 60, and the light emitting display panel 10.

First, the light emitting display panel 10 can include a display panel 200 which display an image, a touch panel 300 in which a touch electrode for touch sensing is provided, and a stretch panel 100 in which electrodes for stretch sensing are provided. However, the light emitting display panel 10 can include only the display panel 200 and the stretch panel 100.

The display panel 200 can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA. For instance, the non-display area NDA can surround the display area DA entirely or only in part(s).

The pixel P included in the display panel 200, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 30. A gate signal GS can be supplied through the gate line GL from the gate driver 20. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility of an electrical charge (for example, an electron), or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 30 and can be connected to the power supply unit through the data driver 30. For example, the reference voltage Vref supplied from the power supply unit can be supplied to the pixels through the sensing line SL, sensing signals transmitted from the pixels P can be converted into digital sensing signals in the data driver 30, and the digital sensing signals can be transmitted to the control driver 40.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

The structure of the pixel P applied to an apparatus for sensing a stretch according to an embodiment of the present disclosure is not limited to the structure illustrated in FIG. 2. Accordingly, the structure of the pixel P can be changed to various shapes.

The touch panel 300 can perform a function of sensing a touch, and for this purpose, can include a touch electrode.

For example, when the touch panel 300 uses a mutual method, the touch electrode can include at least one touch driving electrode and at least one touch receiving electrode. In this case, the touch driver 50 can supply a touch driving signal to the touch driving electrode and can determine whether a touch is present using a touch sensing signal received from the touch receiving electrode by the touch driving signal.

Moreover, when the touch panel 300 senses a touch caused by an electronic pen, the touch driver 50 can supply an uplink signal to the touch driving electrode and determine whether a touch is present by using a downlink signal received from the electronic pen through the touch receiving electrode. In this case, the uplink signal ca be a touch driving signal.

Further, when the touch panel 300 uses a self-cap method, at least one touch electrode can be provided in the touch panel 300. In this case, the touch driver 50 can supply a touch driving signal to the touch electrode and can determine whether there is a touch by using a touch sensing signal received from the touch electrode.

Hereinafter, for convenience of description, an apparatus for sensing a stretch including a touch panel 300 using the mutual method will be described as an example of an apparatus for sensing a stretch according to an embodiment of the present disclosure.

In this case, a touch driving electrode provided in the touch panel 300 can be connected to the touch driver 50 through a touch driving electrode line 31, and a touch receiving electrode provided in the touch panel can be connected to the touch driver 50 through a touch receiving electrode line 32.

The stretch panel 100 can perform a function of sensing whether it is stretched, whether it is bent, and whether it is under tensile stress, and for this purpose, the stretch panel 100 can include three types of stretch electrodes. In the following description, the stretch can be used to refer to bending, or can be used to refer to tensile stress.

Three types of stretch electrodes can include a driving electrode, a mono-receiving electrode, and a cross-receiving electrode.

The driving electrode can be connected to the stretch driver 60 through a driving electrode line TXL, the mono-receiving electrode can be connected to the stretch driver 60 through a mono-receiving electrode line RX_XL, and the cross-receiving electrode can be connected to the stretch driver 60 through a cross-receiving electrode line RX_YL.

The control driver 40 can realign input image data Ri, Gi, and Bi transmitted from an external system 90 by using a timing synchronization signal TSS transmitted from the external system and can generate a data control signal DCS which is to be supplied to the data driver 30 and a gate control signal GCS which is to be supplied to the gate driver 20.

To this end, as illustrated in FIG. 3, the control driver 40 can include a data aligner 430 which realigns input image data Ri, Gi, and Bi to generate image data Data, a control signal generator 420 which generates the gate control signal GCS and the data control signal DCS by using the timing synchronization signal TSS, an input unit 410 which transmits the timing synchronization signal TSS transmitted from the external system 90 to the control signal generator 420 and transmits the input image data Ri, Gi, and Bi transmitted from the external system 90 to the data aligner 430, and an output unit 440 which supplies the data driver 30 with the image data Data generated by the data aligner 430 and the data control signal DCS generated by the control signal generator 420 and supplies the gate driver 20 with the gate control signal GCS generated by the control signal generator 420.

The control signal generator 420 can generate a power control signal supplied to the power supply unit.

The control signal generator 420 can generate a touch control signal supplied to the touch driver 50.

The control signal generator 420 can generate a stretch control signal supplied to the stretch driver 60.

The control driver 40 can further include a storage unit 450 for storing various information. The storage unit 450 can be included in the control driver 40 as illustrated in FIG. 3, but can be separated from the control driver 40 and provided independently.

The external system 90 can perform a function of driving the control driver 40 and an electronic device.

For example, the electronic device can be a wearable device worn on a user's body, as described above. In particular, the wearable device can be worn on a user's wrist, knee, or elbow. The electronic device can output various images, perform communication with an external server over a wireless communication network, and output various voices.

The external system 90 can receive various kinds of sound information and image information over a communication network or can generate image information by itself, and can transmit the image information to the control driver 40. Further, the external system 90 can transmit at least one of stretch status (e.g., whether it is stretched), stretch degree, and stretch coordinates determined by the stretch panel 60 to the outside over a communication network.

The external system 90 can convert the image information into input image data Ri, Gi, and Bi and transmit the input image data Ri, Gi, and Bi to the control driver 40.

The power supply unit can generate various powers and supply the generated powers to the control driver 40, the gate driver 20, the data driver 30, and the touch driver 50.

The gate driver 20 can be directly embedded into the non-display area NDA by using a gate-in panel (GIP) type, or the gate driver 20 can be provided in the display area DA in which light emitting devices ED are provided, or the gate driver 20 can be provided on a chip on film mounted in the non-display area NDA.

The gate driver 20 can supply gate pulses GP1 to GPg to the gate lines GL1 to GLg.

When a gate pulse GP generated by the gate driver 20 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 20 is supplied to the switching transistor Tsw1, the switching transistor Tsw1 can be turned off. When the switching transistor Tsw1 is turned off, a data voltage cannot be supplied to the pixel P any longer.

The gate signal GS supplied to the gate line GL can include the gate pulse GP and the gate-off signal.

To supply gate pulses GP1 to GPg to gate lines GL1 to GLg, the gate driver 20, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 20. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 30 can supply data voltages Vdata to the data lines DL1 to DLd.

To this end, the data driver 30, as illustrated in FIG. 5, can include a shift register 310 which outputs a sampling signal, a latch 320 which latches image data Data received from the control driver 40, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 40, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the display panel 200 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

The touch driver 50 can supply a touch driving signal to the touch panel 300, and can determine whether there is a touch by using a touch sensing signal received from the touch panel 300.

Finally, the stretch driver 60 can supply a stretch driving signal to the stretch panel 100, and can determine whether there is stretch by using a stretch sensing signal received from the stretch panel 100.

Figure 6:
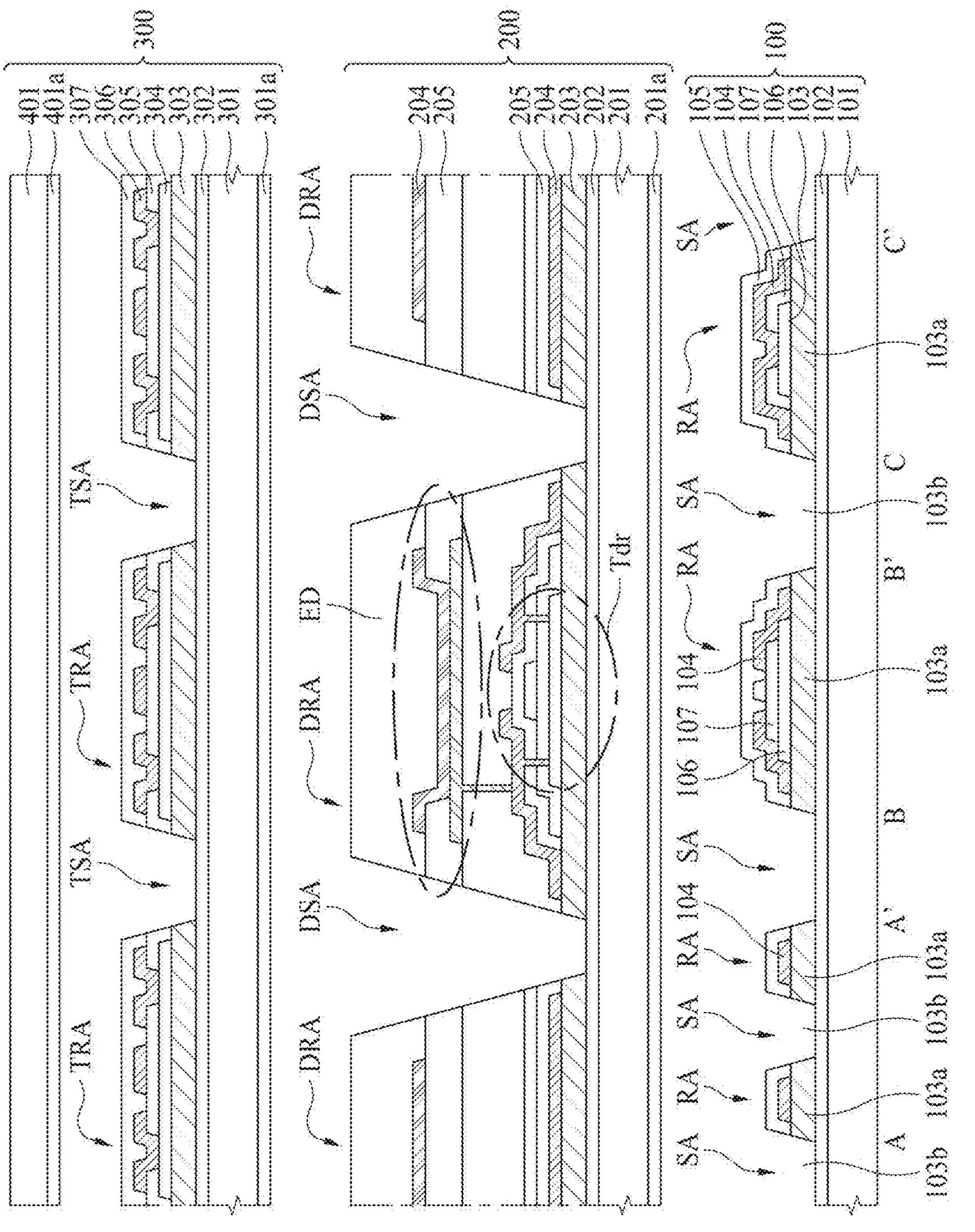
FIG. 6 is an example diagram schematically illustrating a structure of a light emitting display panel applied to an apparatus for sensing a stretch according to an embodiment of the present disclosure.

FIG. 6 is an example diagram schematically illustrating a structure of a light emitting display panel applied to an apparatus for sensing a stretch according to an embodiment of the present disclosure.

First, the stretch panel 100 can include a stretch support substrate 101, a stretch substrate 103 provided on the stretch support substrate 101, an adhesive 102 to bond the stretch support substrate 101 and the stretch substrate 103, a metal electrode 104 provided on the stretch substrate 103, and at least one stretch passivation layer 105 covering the metal electrode 104.

The stretch support substrate 101 can be formed of, for example, polydimethylsiloxane (PDMS). For example, the stretch support substrate 101 can be formed of a material such as silicon. Therefore, the stretch support substrate 101 is a stretchable substrate.

The stretch substrate 103 can be formed of a material such as polyimide.

The metal electrode 104 can be provided on the stretch substrate 103. The metal electrode 104 can be formed of copper, and further, can be formed of various metals used in manufacturing a light emitting display apparatus. The metal electrode 104 forms a stretch electrode.

The metal electrode 104 can be covered by the stretch passivation layer 105.

The stretch passivation layer 105 can be formed of, for example, silicon oxide (SiOx) or silicon nitride (SiNx), metal oxide or metal nitride, or can be formed of various inorganic materials used in manufacturing a light emitting display apparatus.

At least one inorganic material layer can be further included in the stretch panel 100 in addition to the stretch passivation layer 105.

The at least one inorganic material layer can be, for example, a bridge insulation layer 107 to insulate the bridge 106 from the metal electrode 104. The bridge 106 can be formed of the same metal as the metal electrode 104, and further, can be formed of various metals used in manufacturing a light emitting display apparatus.

In order to allow the stretch panel 100 to be stretched, as illustrated in FIG. 6, the stretch substrate 103 and the stretch passivation layer 105 are not provided in an area other than an area where the metal electrode 104 and the bridge 106 are located in the stretch panel 100, and at least one inorganic layer provided in the stretch panel 100 is also not provided in the area.

In the following description, an area in which the metal electrode 104 or the bridge 106 is provided is referred to as a rigid area RA. Further, an area in which the metal electrode 104, the bridge 106, the stretch substrate 103, and the stretch passivation layer 105 are not provided is referred to as a soft area SA.

To provide an additional description, the stretch substrate 103 is provided between the stretch support substrate 101 and the metal electrodes 104, and the stretch substrate 103 includes mesh portions 103*a* connected like a mesh. Opening portions 103*b* are formed between the mesh portions 103*a*.

In this case, the metal electrodes 104 can be provided only in the mesh portions 103*a*.

For example, in the following description, the stretch substrate 103 can mean the mesh portion 103*a*.

Further, the rigid area RA can correspond to the mesh portion 103*a*, and the soft area SA can correspond to the opening portion 103*b*.

A brief description of a manufacturing process of the stretch panel 100 is as follows.

A material such as polyimide is deposited on a carrier substrate (e.g., a glass substrate) to form a stretch substrate layer.

Metal electrodes 104 are formed on the stretch substrate layer.

The metal electrodes 104 are covered by a stretch passivation layer material.

When the stretch substrate layer and the stretch passivation layer material in an area without the metal electrode 104 are removed by, for example, a laser, the stretch substrate 103 and the stretch passivation layer 105 are formed, as illustrated in FIG. 6.

After that, the carrier substrate is removed.

The stretch support substrate 101 is attached to the stretch substrate 103, from which the carrier substrate is removed, by using an adhesive 102.

Accordingly, the stretch panel 100 can be finally manufactured.

Next, the display panel 200 can include a display support substrate 201, a display substrate 203 provided on the display support substrate 201, a display substrate adhesive 202 bonding the display support substrate 201 and the display substrate 203, at least two display electrodes 204 provided on different layers, and at least two display insulation layers 205 covering at least two display electrodes 204.

The display support substrate 201 can be formed of, for example, polydimethylsiloxane (PDMS). For example, the display support substrate 201 can be formed of a material such as silicon. Therefore, the display support substrate 201 is a stretchable substrate. The display substrate 203 can be formed of a material such as polyimide.

At least two display electrodes 204, which form various types of lines and electrodes such as a gate, source and electrode of each of the transistors Tsw1, Tsw2, and Tdr, a gate line GL, a data line DL, an anode, and a cathode, can be provided on the display substrate 203.

Each of the at least two display electrodes 204 can be formed of at least one opaque electrode, at least one transparent electrode, or at least one opaque electrode and at least one transparent electrode.

At least two display electrodes 204 can be formed of different materials.

A display insulation layer 205 can be provided between the display electrodes 204 provided on different layers. The display insulation layer 205 can include at least one organic material layer, can include at least one inorganic material layer, or can include at least one organic material layer and at least one inorganic material layer.

An upper end of the light emitting device ED including the anode, the light emitting layer, and the cathode can be covered by an encapsulation layer. The encapsulation layer can be included in at least two display insulation layers 205.

The encapsulation layer can include at least one inorganic material layer, at least one organic material layer, or at least one inorganic material layer and at least one organic material layer.

In order to allow the display panel 200 to be stretched, the display substrate 203 and at least two display insulation layers 205 can be removed from the display panel 200 in areas except for the area where the display electrodes 204 are located, as illustrated in FIG. 6.

In the following description, an area in which the display electrode 204 remains is referred to as a display rigid area DRA. Furthermore, an area in which the display electrode 204 and the display substrate 203 are not provided is referred to as a display soft area DSA.

A process of manufacturing the display panel 200 will be briefly described as follows.

A material such as polyimide is deposited on a carrier substrate (e.g., a glass substrate) to form a display substrate layer.

At least two display electrodes 204 and at least two display insulation layer materials are formed on the display substrate layer.

Transistors Tsw1, Tsw2, and Tdr configuring the pixel driving circuit PDC as illustrated in FIG. 2, a gate line GL, a data line DL, and a light emitting device ED can be formed by at least two display electrodes 204 and at least two display insulation layer materials.

When a display substrate layer and a display insulation layer material in an area without the display electrode 204 are removed by, for example, a laser, the display substrate 203 and at least two insulation layers 205 as illustrated in FIG. 6 are formed.

After that, the carrier substrate is removed.

The display support substrate 201 is attached to the display substrate 203, from which the carrier substrate is removed, by using the display substrate adhesive 202.

Accordingly, the display panel 200 can be finally manufactured.

The display support substrate 201 can be bonded to the stretch panel 100 by using a display support substrate adhesive 201*a*.

Accordingly, the display panel 200 and the stretch panel 100 can be finally attached to each other.

Before the display panel 200 and the stretch panel 100 are bonded, another stretch support substrate can be further attached to an upper end of the stretch panel 100. In this case, another stretch support substrate provided on the upper end of the stretch panel 100 and the display support substrate 201 of the display panel 200 can be bonded by the display support substrate adhesive 201*a*.

Another stretch support substrate provided at the upper end of the stretch panel 100 can be formed of the same material as the stretch support substrate 101 provided at the lower end of the stretch panel 100.

Finally, as described above, the touch panel 300 can be formed using a mutual method or a self-cap method. Hereinafter, for convenience of description, the touch panel 300 using the mutual method will be described as an example of a touch panel applied to an apparatus for sensing a stretch according to an embodiment of the present disclosure.

The touch panel 300 can include a touch support substrate 301, a touch substrate 303 provided on the touch support substrate 301, a touch substrate adhesive 302 for bonding the touch support substrate 301 and the touch substrate 303, a touch bridge 304 provided on the touch substrate 303, a touch bridge insulation layer 305 covering the touch bridge 304, touch electrode layers 306 provided on the touch bridge insulation layer 305, and a touch passivation layer 307 covering the touch electrode layers 306.

The touch support substrate 301 can be formed of, for example, polydimethylsiloxane (PDMS). For example, the touch support substrate 301 can be formed of a material such as silicon. Therefore, the touch support substrate 301 is a stretchable substrate.

The touch substrate 303 can be formed of a material such as polyimide.

The touch bridge 304 can be provided on the touch substrate 303. The touch bridge 304 can be formed of at least one opaque electrode, at least one transparent electrode, or at least one opaque electrode and at least one transparent electrode.

The touch bridge 304 can be covered by the touch bridge insulation layer 305. The touch bridge insulation layer 305 can include at least one organic layer, at least one inorganic layer, or at least one organic layer and at least one inorganic layer.

Touch electrode layers 306 forming touch driving electrodes or touch receiving electrodes are provided on the touch bridge insulation layer 305.

Two touch electrode layers 306 forming the touch driving electrode or the two touch electrode layers 306 forming the touch receiving electrode can be connected to the touch bridge 304 through a contact hole provided in the touch bridge insulation layer 305.

For example, in an area where the touch driving electrode and the touch receiving electrode intersect, the two touch electrode layers 306 forming the touch driving electrode or the two touch electrode layers 306 forming the touch receiving electrode can be connected through the touch bridge 304.

The touch electrode layers 306 can be covered by the touch passivation layer 307. The touch passivation layer 307 can include at least one organic layer, at least one inorganic layer, or at least one organic layer and at least one inorganic layer.

In the following description, an area where the touch bridge 304 or the touch electrode layer 304 remains is referred to as a touch rigid area TRA. In addition, an area where the touch bridge 304, the touch electrode layer 304, and the touch substrate 303 are not provided is referred to as a touch soft area TSA.

A process of manufacturing the touch panel 300 will be briefly described as follows.

A material such as polyimide is deposited on a carrier substrate (e.g., a glass substrate) to form a touch substrate layer.

At least one touch bridge 304 can be provided on the touch substrate layer, the touch bridge 304 can be covered by a touch bridge insulation material, at least one touch electrode layer 306 can be provided on the touch bridge insulation material, and the touch electrode layer 306 can be covered by a touch passivation material.

When the touch substrate layer and the touch insulation layer material in an area without the touch bridge 304 and the touch electrode layer 306 are removed by, for example, a laser, the touch substrate 303 as illustrated in FIG. 6 is formed.

After that, the carrier substrate is removed.

The touch support substrate 301 is attached to the touch substrate 303, from which the carrier substrate is removed, by using the touch substrate adhesive 302.

Another touch support substrate 401 can be attached to an upper end of the touch passivation layer 307 by using a touch passivation layer adhesive 401*a*. Another touch support substrate 401 can be formed of the same material as the touch support substrate 301 provided at a lower end of the touch panel 300.

Accordingly, the touch panel 300 can be finally manufactured.

The touch support substrate 301 can be bonded to the display panel 200 by using a touch support substrate adhesive 301*a*.

Accordingly, the touch panel 300 and the display panel 200 can be finally attached to each other.

Before the touch panel 300 and the display panel 200 are bonded, another display support substrate can be further attached to an upper end of the display panel 200. In this case, another display support substrate provided on the upper end of the display panel 200 and the touch support substrate 301 of the touch panel 300 can be bonded by the touch support substrate adhesive 301*a*.

Another display support substrate provided at the upper end of the display panel 200 can be formed of the same material as the display support substrate 201 provided at the lower end of the display panel 200.

An apparatus for sensing a stretch according to an embodiment of the present disclosure can include only the stretch panel 100, or can include the stretch panel 100 and display panel 200, or can include the stretch panel 100, display panel 200, and touch panel 300.

When an apparatus for sensing a stretch according to an embodiment of the present disclosure includes only the stretch panel 100, another stretch support substrate can be attached to an upper surface of the stretch panel 100.

When an apparatus for sensing a stretch according to an embodiment of the present disclosure includes the stretch panel 100 and the display panel 200 provided on the stretch panel 100, another display support substrate can be attached to the upper surface of the display panel 200.

Figure 7:
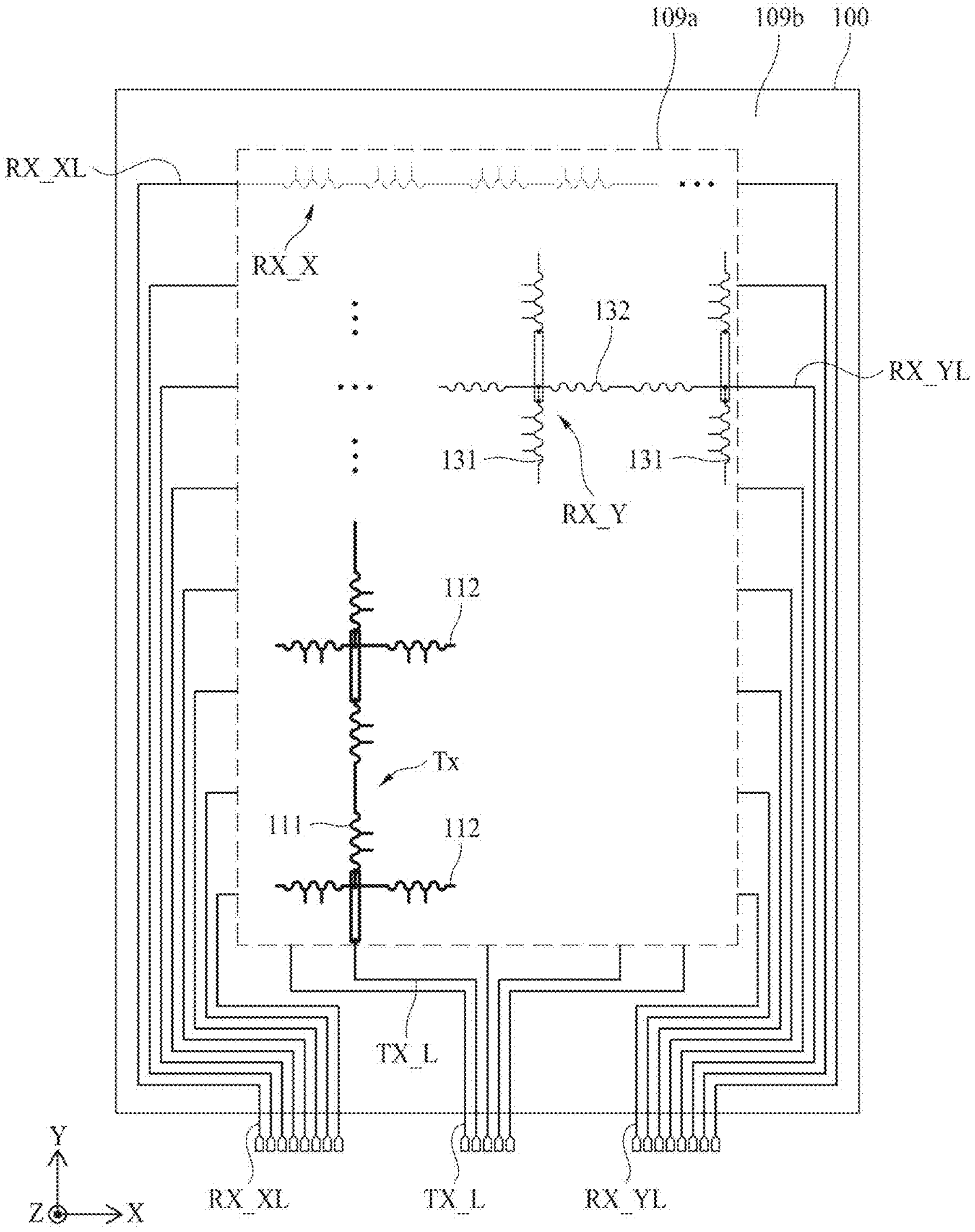
FIG. 7 is an example diagram schematically illustrating a structure of a stretch panel applied to an apparatus for sensing a stretch according to an embodiment of the present disclosure.

FIG. 7 is an example diagram schematically illustrating a structure of a stretch panel applied to an apparatus for sensing a stretch according to an embodiment of the present disclosure.

As illustrated in FIG. 7, the stretch panel 100 can include a stretch area 109*a*, in which driving electrodes TX, mono-receiving electrodes RX_X, and cross-receiving electrodes RX_Y are provided, and a stretch line area 109*b*, in which driving electrode lines TX_L connected to the driving electrodes TX, mono-receiving electrode lines RX_XL connected to the mono-receiving electrodes RX_X, and cross-receiving electrode lines RX_YL connected to the cross-receiving electrodes RX_Y.

The stretch area 109*a* can correspond to the display area DA, but does not necessarily coincide with the display area DA.

As described above, the stretch panel 100 can include three types of stretch electrodes to sense whether there is stretch.

Three types of stretch electrodes include a driving electrode TX, a mono-receiving electrode RX_X, and a cross-receiving electrode RX_Y.

Each of the driving electrodes TX extends in a first direction, for example, the Y-axis direction Y, of the stretch panel 100 and can intersect with the mono-receiving electrodes RX_X and the cross-receiving electrodes RX_Y, as illustrated in FIG. 7. In the following description, the first direction can be represented by the reference numeral Y.

Each of the mono-receiving electrodes RX_X extends in a second direction different from the first direction Y, for example, the X-axis direction X, as illustrated in FIG. 7. In the following description, the second direction can be represented by the reference numeral X.

Each of the cross-receiving electrodes RX_Y extends in the second direction X, as illustrated in FIG. 7.

The driving electrode lines TX_L, the mono-receiving electrode lines RX_XL, and the cross-receiving electrode lines RX_YL are connected to the stretch driver 60.

The stretch driver 60 can sequentially supply stretch driving signals to the driving electrodes TX. When the stretch driving signal is supplied from the stretch driver 60 to the driving electrode TX, if the stretch panel 100 is stretched, capacitance between the driving electrode TX and the mono-receiving electrode RX_X can be changed, or capacitance between the driving electrode TX and the cross-receiving electrode RX_Y can be changed.

For example, when the stretch panel 100 is stretched in the first direction Y, for example, in the vertical direction of the stretch panel 100 illustrated in FIG. 7, the capacitance between the driving electrode TX and the cross-receiving electrode RX_Y can be changed, and accordingly, at least one of current, voltage, and capacitance of a stretch sensing signal received through the cross-receiving electrode RX_Y can be changed.

The stretch driver 60 can analyze a change amount of at least one of current, voltage, and capacitance to determine at least one of stretch in the vertical direction of the stretch panel 100, a degree of stretch in the vertical direction of the stretch panel 100, and stretch coordinates in which stretch occurs.

However, after the stretch driver 60 generates stretch information corresponding to a change amount of at least one of current, voltage, and capacitance, the stretch information can be transmitted to the control driver 40 or a separate determination unit. In this case, the control driver 40 or the separate determination unit can determine at least one of stretch in the vertical direction of the stretch panel 100, a degree of stretch in the vertical direction of the stretch panel 100, and stretch coordinates in which stretch occurs, by using the stretch information.

Further, when the stretch panel 100 is stretched in the second direction X, i.e., the left and right directions of the stretch panel 100 illustrated in FIG. 7, the capacitance between the driving electrode TX and the mono-receiving electrode RX_X can be changed, and accordingly, at least one of the current and voltage of the stretch sensing signal received through the mono-receiving electrode RX_X can be changed.

The stretch driver 60 can analyze a change amount of at least one of current, voltage, and capacitance to determine at least one of stretch in the left and right directions of the stretch panel 100, a degree of stretch in the left and right directions, and stretch coordinates in which stretch occurs.

However, after the stretch driver 60 generates stretch information corresponding to a change amount of at least one of current, voltage, and capacitance, the stretch information can be transmitted to the control driver 40 or a separate determination unit. In this case, the control driver 40 or the separate determination unit can determine at least one of stretch in the left and right directions of the stretch panel 100, a degree of stretch in the left and right directions of the stretch panel 100, and stretch coordinates in which stretch occurs, by using the stretch information.

For example, the change amount in capacitance between the driving electrode TX and the cross-receiving electrode RX_Y can be used to determine whether the stretch panel 100 is stretched in the first direction Y (e.g., vertical direction) of the stretch panel 100, and the change amount in capacitance between the driving electrode TX and the mono-receiving electrode RX_X can be used to determine whether the stretch panel 100 is stretched in the second direction X (e.g., left and right direction) of the stretch panel 100.

Figure 8:
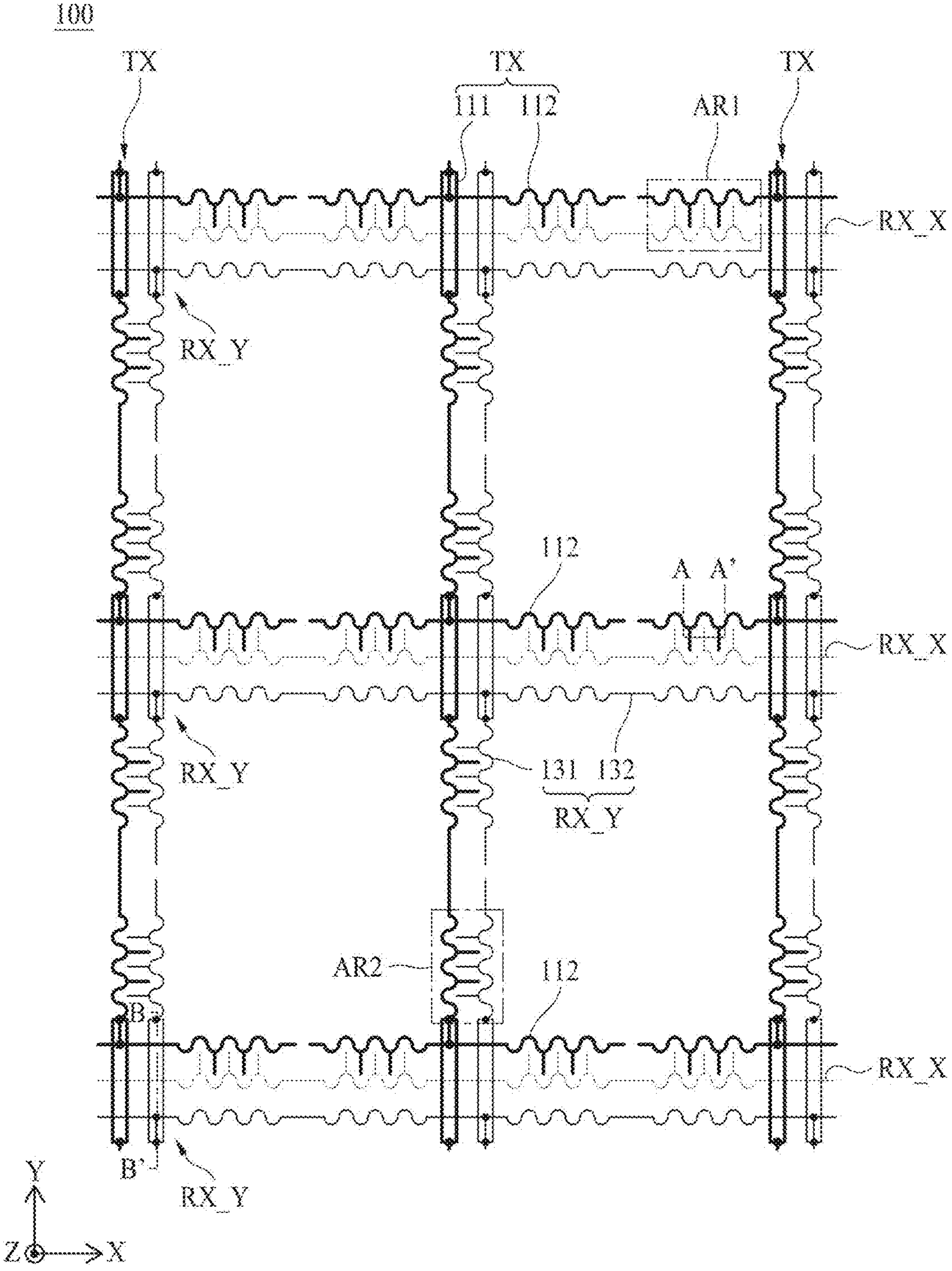
FIG. 8 is an example diagram illustrating three driving electrodes, three mono-receiving electrodes, and three cross-receiving electrodes provided in a stretch panel of an apparatus for sensing a stretch according to an embodiment of the present disclosure.

FIG. 8 is an example diagram illustrating three driving electrodes, three mono-receiving electrodes, and three cross-receiving electrodes provided in a stretch panel of an apparatus for sensing a stretch according to an embodiment of the present disclosure.

The stretch panel 100 can be provided with various numbers of driving electrodes TX, mono-receiving electrodes RX_X, and cross-receiving electrodes RX_Y depending on a size of the stretch panel 100. Among at least three driving electrodes TX, at least three mono-receiving electrodes RX_X, and at least three cross-receiving electrodes RX_Y which are provided in the stretch panel 100, three driving electrodes TX, three mono-receiving electrodes RX_X and three cross-receiving electrodes RX_Y are illustrated in FIG. 8.

The stretch panel 100 applied to an apparatus for sensing a stretch according to an embodiment of the present disclosure, as described with reference to FIGS. 6 and 7, includes the stretch support substrate 101 to be stretched, and the driving electrodes TX, mono-receiving electrodes RX_X, and cross-receiving electrodes RX_Y which are provided on the stretch support substrate 101.

The stretch substrate 103 is provided between the driving electrodes TX, the mono-receiving electrodes RX_X, and the cross-receiving electrodes RX_Y, and the stretch support substrate 101.

The stretch substrate 103 includes patterned mesh portions and opening portions that are empty spaces between the mesh portions. Accordingly, the stretch substrate 103 can be stretched together with the stretched support substrate 101, and thus the driving electrodes TX, mono-receiving electrodes RX_X, and cross-receiving electrodes RX_Y provided on the stretch substrate 103 can also be stretched.

As illustrated in FIG. 8, each of the driving electrodes TX includes a first direction driving electrode 111 extending in the first direction Y of the stretch support substrate 101 and second direction driving electrodes 112 connected to the first direction driving electrode 11 and extending in the second direction X different from the first direction Y.

For example, each of the driving electrodes TX includes one first direction driving electrode 111 and at least two second direction driving electrodes 112.

In this case, each of the driving electrodes TX is connected to the driving electrode line TXL, as illustrated in FIG. 7, and can be connected to the stretch driver 60 through the driving electrode line TXL.

In particular, the first direction driving electrode 111 of each of the driving electrodes TX can be connected to the stretch driver 60 through the driving electrode line TXL.

Each of the mono-receiving electrodes RX_X can extend in the second direction X.

In particular, each of the mono-receiving electrodes RX_X can be provided continuously in the second direction X of the stretch panel 100.

In this case, each of the mono-receiving electrodes RX_X is connected to the mono-receiving electrode line RX_XL, as illustrated in FIG. 7, and can be connected to the stretch driver 60 through the mono-receiving electrode line RX_XL.

Each of the cross-receiving electrodes RX_Y can extend in the first direction Y and the second direction X.

Each of the cross-receiving electrodes RX_Y includes a second direction cross-receiving electrode 132 extending in the second direction X and first direction cross-receiving electrodes 131 connected to the second direction cross-receiving electrode 132 and extending in the first direction Y, as illustrated in FIG. 8.

For example, each of the cross-receiving electrodes RX_Y includes one second direction cross-receiving electrode 132 and at least two first direction cross-receiving electrodes 131.

In this case, each of the cross-receiving electrodes RX_Y is connected to the cross-receiving electrode line RX_YL, as illustrated in FIG. 7, and can be connected to the stretch driver 60 through the cross-receiving electrode line RX_YL.

In particular, the second direction cross-receiving electrode 132 of each of the cross-receiving electrodes RX_Y can be connected to the stretch driver 60 through the cross-receiving electrode line RX_YL.

Hereinafter, the structure of each of the driving electrode TX, the mono-receiving electrode RX_X, and the cross-receiving electrode RX_Y will be described in detail.

Figure 9:
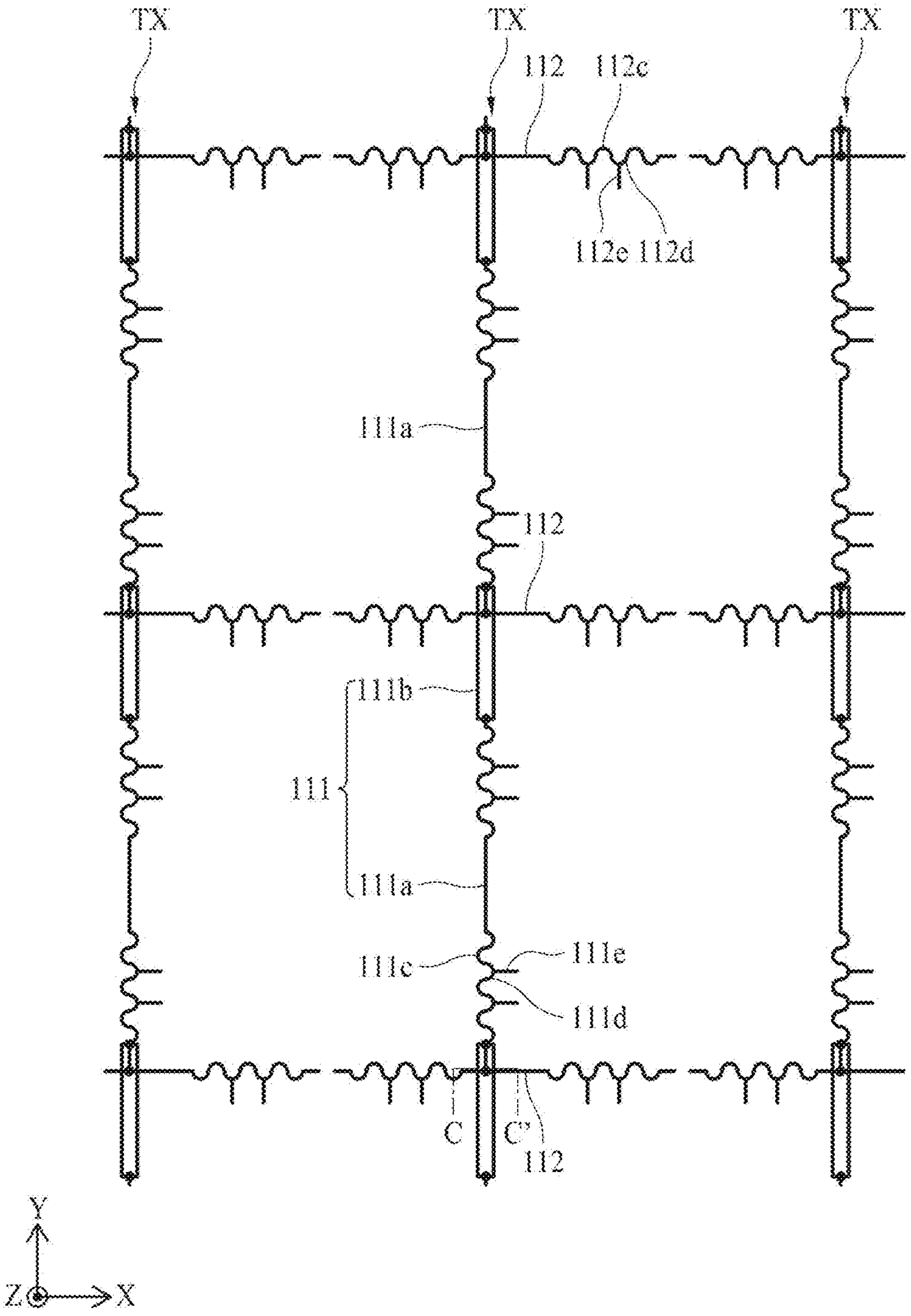
FIG. 9 is an example diagram illustrating a structure of three driving electrodes illustrated in FIG. 8.

FIG. 9 is an example diagram illustrating a structure of three driving electrodes illustrated in FIG. 8.

As described above, each of the driving electrodes TX includes the first direction driving electrode 111 extending in the first direction Y of the stretch support substrate 101 and second direction driving electrodes 112 connected to the first direction driving electrode 111 and extending in the second direction Y different from the first direction Y.

For example, each of the driving electrodes TX includes one first direction driving electrode 111 and at least two second direction driving electrodes 112.

First, each of the second direction driving electrodes 112 and the first direction driving electrode 111 configuring the driving electrode TX have a cross shape.

For example, as illustrated in FIG. 9, the first direction driving electrode 111 and the second direction driving electrode 112 intersect each other, and accordingly, the first direction driving electrode 111 and the second direction driving electrode 112 have a cross shape.

For example, the first direction driving electrode 111 extends from an upper end to a lower end of the stretch area 109*a* illustrated in FIG. 7 and can be connected to the stretch driver 60.

The second direction driving electrode 112 can, for example, extend along the second direction X in a part of the stretch area 109*a* illustrated in FIG. 7.

In this case, the second direction driving electrodes 112 adjacent along the second direction X are spaced apart from each other.

For example, at least two second direction driving electrodes 112 can be provided along the second direction X of the stretch panel 100, at least two second direction driving electrodes 112 can be spaced apart from each other, and at least two second direction driving electrodes 112 can be arranged in a line.

Next, the first direction driving electrode 111 includes two first direction driving electrode branches 111*a* adjacent to each other and a driving electrode bridge 111*b* connecting the two first direction driving electrode branches 111*a*.

For example, two first direction driving electrode branches 111*a* are connected to the driving electrode bridge 111*b*, and the two first direction driving electrode branches 111*a* extend in the first direction Y.

The two first direction driving electrode branches 111*a* can be formed on the same layer as the driving electrode bridge 111*b*, can be provided at both ends of the driving electrode bridge 111*b*, and can be connected to the driving electrode bridge 111*b*.

For example, the two first direction driving electrode branches 111*a* can be electrically connected to each other by the driving electrode bridge 111*b*.

In this case, the second direction driving electrode 112 can be connected to the driving electrode bridge 111*b* through a contact hole formed in the bridge insulation layer covering the driving electrode bridge 111*b*.

For example, a cross-sectional surface taken along a line C-C' illustrated in FIG. 9 can be a cross-sectional surface C-C' illustrated in FIG. 6.

For example, as described with reference to FIG. 6, the stretch support substrate 101 can be connected to the stretch substrate 103 through the adhesive 102.

The stretch substrate 103 can include mesh portions 103*a* connected like a mesh, and opening portions 103*b* are formed between the mesh portions 103*a*.

In this case, in the cross-sectional surface C-C' of FIG. 6, the bridge 106 can be the driving electrode bridge 111*b*, and the metal electrode 104 can be the second direction driving electrode 112.

For example, as illustrated in FIG. 6, the driving electrode bridge 111*b* can be provided on the mesh portion 103*a*, the driving electrode bridge 111*b* can be covered by the bridge insulation layer 107, and the second direction driving electrode 112 can be connected to the driving electrode bridge 111*b* through a contact hole formed in the bridge insulation layer 107 covering the driving electrode bridge 111*b*.

To provide an additional description, the first direction driving electrode branches 111*a* and the second direction driving electrodes 112 are electrically connected through the driving electrode bridges 111*b*.

Accordingly, the driving electrode TX including the first direction driving electrode branches 111*a*, the driving electrode bridges 111*b*, and the second direction driving electrodes 112 can be used as one electrode.

Next, as described above, the first direction driving electrode 111 includes two first direction driving electrode branches 111*a* adjacent to each other and a driving electrode bridge 111*b* connecting the two first direction driving electrode branches 111*a*.

In this case, each of the two first direction driving electrode branches 111*a* can have a rounded shape with a mountain 111*c* and a valley 111*d*, as illustrated in FIG. 9.

For example, in the first direction driving electrode branch 111*a* illustrated in FIG. 9, the mountain 111*c* can mean a portion protruding in the left direction, and the valley 111*d* can mean a portion protruding in the right direction.

For example, the first direction driving electrode branch 111*a* can include at least one mountain 111*c* protruding in the left direction and at least one valley 111*d* protruding in the right direction, and thus can have the rounded shape.

Because the first direction driving electrode branch 111*a* has the rounded shape having the mountain 111*c* and the valley 111*d* provided along the first direction Y, the first direction driving electrode branch 111*a* can be stretched along the first direction Y.

In this case, as illustrated in FIG. 9, a second direction driving electrode bar 111*e* protruding in the second direction X is provided in the valley 111*d* provided in the first direction driving electrode branch 111*a*.

The second direction driving electrode bar 111*e* extends in a direction opposite to the direction in which the mountain 111*c* is located. For example, the second direction driving electrode bar 111*e* can protrude from the valley 111*d* in the right direction of the valley 111*d*, as illustrated in FIG. 9.

Finally, each of the second direction driving electrodes 112 can, for example, extend from the left to the right of the stretch area 109*a* illustrated in FIG. 7.

Each of the second direction driving electrodes 112 can have a rounded shape having a mountain 112*c* and a valley 112*d*, as illustrated in FIG. 9.

For example, in the second direction driving electrode 112 illustrated in FIG. 9, the mountain 112*c* can mean a portion protruding in an upper direction, and the valley 112*d* can mean a portion protruding in a lower direction.

For example, the second direction driving electrode 112 can include at least one mountain 112*c* protruding in the upper direction and at least one valley 112*d* protruding in the lower direction, and thus can have the rounded shape.

Because the second direction driving electrode 112 has a rounded shape having the mountain 112*c* and the valley 112*d* provided along the second direction X as described above, the second direction driving electrode 112 can be stretched along the second direction X.

In this case, as illustrated in FIG. 9, a first direction driving electrode bar 112*e* protruding in the first direction Y is provided in the valley 112*d* provided in the second direction driving electrode 112.

The first direction driving electrode bar 112*e* extends in a direction opposite to a direction in which the mountain 112*c* is located. For example, the first direction driving electrode bar 112*e* can protrude from the valley 112*d* in the lower direction of the valley 112*d*, as illustrated in FIG. 9.

Figure 10:
FIG. 10 is an example diagram illustrating a structure of three mono-receiving electrodes illustrated in FIG. 8.
Figure 11:
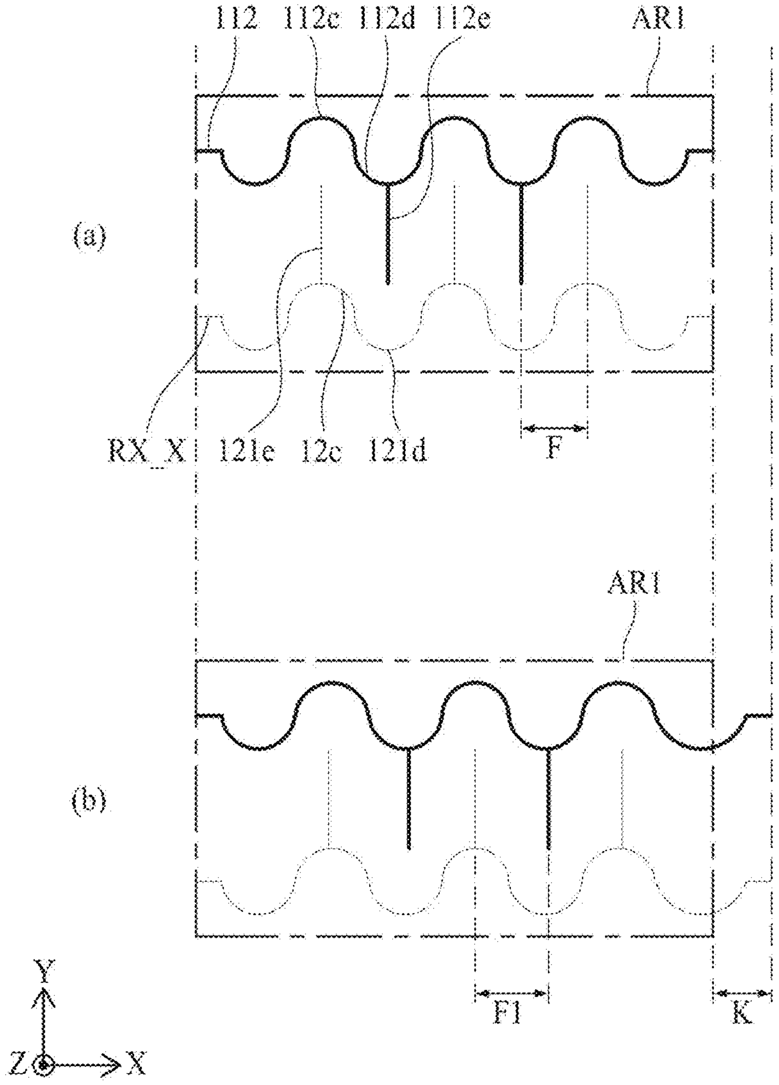
FIG. 11 is an example diagram illustrating a first area illustrated in FIG. 8.

FIG. 10 is an example diagram illustrating a structure of three mono-receiving electrodes illustrated in FIG. 8, and FIG. 11 is an example diagram illustrating a first area illustrated in FIG. 8. In particular, (a) of FIG. 11 illustrates a state in which the second direction driving electrode 112 and the mono-receiving electrode RX_X are not stretched, and (b) of FIG. 11 illustrates a state in which the second direction driving electrode 112 and the mono-receiving electrode RX_X are stretched.

Each of the mono-receiving electrodes RX_X can extend in the second direction X of the stretch support substrate 101, as described above.

Each of the mono-receiving electrodes RX_X extends from the left end to the right end of the stretch area 109*a* illustrated in FIG. 7 and is connected to the stretch driver 60.

First, each of the mono-receiving electrodes RX_X can have a rounded shape having a mountain 121*c* and a valley 121*d*, as illustrated in FIG. 10.

For example, in the mono-receiving electrode RX_X illustrated in FIG. 10, the mountain 121*c* can mean a portion protruding in the upper direction, and the valley 121*d* can mean a portion protruding in the lower direction.

For example, the mono-receiving electrode RX_X can include at least one mountain 121*c* protruding in the upper direction and at least one valley 121*d* protruding in the lower direction, and thus can have the rounded shape.

Because the mono-receiving electrode RX_X has the rounded shape having the mountain 121*c* and the valley 121*d* provided along the second direction X, the mono-receiving electrode RX_X can be stretched along the second direction X.

In this case, as illustrated in FIG. 10, a first direction mono-receiving electrode bar 121*e* protruding in the first direction Y is provided in the mountain 121*c* provided in the mono-receiving electrode RX_X.

The first direction mono-receiving electrode bar 121*e* extends in a direction opposite to a direction in which the valley 121*d* is located. For example, the first direction mono-receiving electrode bar 121*e* can protrude from a mountain 121*c* in the upper direction of the mountain 121*c*, as illustrated in FIG. 10.

Next, among the second direction driving electrodes 112 provided in the driving electrodes TX provided along the second direction X, the second direction driving electrodes 112 adjacent along the second direction X can be spaced apart from each other by a certain interval and can be provided in a row.

For example, as illustrated in FIGS. 8 and 9, the driving electrodes TX can be provided along the second direction X. In this case, the driving electrodes TX spaced apart along the second direction X are independently driven.

Therefore, among the second direction driving electrodes 112 provided in the driving electrodes TX provided along the second direction X, the second direction driving electrodes 112 adjacent along the second direction X are spaced apart at regular interval.

Further, among the second direction driving electrodes 112 provided in the driving electrodes TX provided along the second direction X, the second direction driving electrodes 112 adjacent along the second direction X can be provided in a row.

Each of the mono-receiving electrodes RX_X extends from the left end to the right end of the stretch area 109*a*.

In this case, the mono-receiving electrode RX_X can be provided parallel to the second direction driving electrodes 112 provided in a row.

For example, the second direction driving electrodes 112 provided in a row can be provided on the same layer as the mono-receiving electrode RX_X and can be provided parallel to the mono-receiving electrode RX_X.

To provide an additional description, one mono-receiving electrode RX_X can be provided parallel to at least two second direction driving electrodes 112.

Next, as described above, the mono-receiving electrode RX_X can have the rounded shape having the mountain 121*c* and the valley 121*d*, and the mountain 121*c* can be provided with the first direction mono-receiving electrode bar 121*e* protruding in the first direction Y.

Further, each of the second direction driving electrodes 112 provided parallel to the mono-receiving electrode RX_X can have the rounded shape having the mountain 112*c* and the valley 112*d*, and the valley 112*d* can be provided with the first direction driving electrode bar 112*e* protruding in the first direction Y.

In this case, the first direction mono-receiving electrode bar 121*e* and the first direction driving electrode bar 112*e* can be provided adjacent to each other along the second direction X, as illustrated in a first area AR1 of FIGS. 8 and 11.

For example, the first direction mono-receiving electrode bar 121*e* and the first direction driving electrode bar 112*e* are adjacent to and spaced apart from each other.

For example, a cross-sectional surface taken along line A-A' illustrated in FIG. 8 can be a cross-sectional surface A-A' illustrated in FIG. 6.

For example, as described with reference to FIG. 6, the stretch support substrate 101 can be connected to the stretch substrate 103 through the adhesive 102.

The stretch substrate 103 can include mesh portions 103*a* connected like a mesh, and opening portions 103*b* are formed between the mesh portions 103*a*.

In this case, in the cross-sectional surface A-A' of FIG. 6, the two metal electrodes 104 can be the first direction mono-receiving electrode bar 121*e* and the first direction driving electrode bar 112*e*.

For example, each of the first direction mono-receiving electrode bar 121*e* and the first direction driving electrode bar 112*e* can be provided on the mesh portion 103*a* and can be covered by the stretch passivation layer 105, as illustrated in FIG. 6.

Finally, the first direction mono-receiving electrode bar 121*e* of the mono-receiving electrode RX_X can be provided in the mountain 121*c* of the mono-receiving electrode RX_X, and can protrude toward the mountain 112*c* of the second direction driving electrode 112 adjacent to the first direction mono-receiving electrode bar 121*e*, as illustrated in FIG. 11.

In this case, the first direction driving electrode bar 112*e* provided in the valley 112*d* of the second direction driving electrode 112 adjacent to the first direction mono-receiving electrode bar 121*e* can protrude toward the valley 121*d* of the mono-receiving electrode RX_X.

For example, the mountain 121*c* of the mono-receiving electrode RX_X and the mountain 112*c* of the second direction driving electrode 112 can be arranged in a vertical row along the first direction Y, and the valley 121*d* of the mono-receiving electrode RX_X and the valley 112*d* of the second direction driving electrode 112 can be arranged in a vertical row along the first direction Y.

Therefore, the first direction mono-receiving electrode bar 121*e* and the first direction driving electrode bar 112*e* can be provided adjacent to each other along the second direction X.

A method of determining whether the stretch panel 100 is stretched along the second direction X will be described with reference to FIG. 11.

For example, as described above, the stretch driver 60 sequentially supplies stretch driving signals to the driving electrodes TX.

In this case, if there is no stretch, as illustrated in (a) of FIG. 11, the distance F between the first direction driving electrode bar 112*e* and the mono-receiving electrode bar 121*e* is kept constant.

However, as illustrated in (a) of FIG. 11, when the stretch panel 100 is stretched in the second direction X, the second direction driving electrode 112 and the mono-receiving electrode RX_X can be stretched by K.

In this case, the distance F between the first direction driving electrode bar 112*e* and the first direction mono-receiving electrode bar 121*e* also increases.

For example, a distance F1 between the first direction driving electrode bar 112*e* and the first direction mono-receiving electrode bar 121*e* after the second direction driving electrode 112 and the mono-receiving electrode RX_X are stretched by K in the second direction X is greater than the distance F between the first direction driving electrode bar 112*e* and the first direction mono-receiving electrode bar 121*e* before the second direction driving electrode 112 and the mono-receiving electrode RX_X are stretched in the second direction X.

The capacitance formed between the first direction driving electrode bar 112*e* and the first direction mono-receiving electrode bar 121*e* varies based on the distance between the first direction driving electrode bar 112*e* and the first direction mono-receiving electrode bar 121*e*.

Therefore, by analyzing the capacitance between the first direction driving electrode bar 112*e* and the first direction mono-receiving electrode bar 121*e* illustrated in (a) of FIG. 11 and the capacitance between the first direction driving electrode bar 112*e* and the first direction mono-receiving electrode bar 121*e* illustrated in (b) of FIG. 11, whether or not it is stretched in the second direction X can be determined.

For example, when the capacitance increases or decreases, it can be determined that the stretch panel 100 is stretched in the second direction X.

Further, the degree of stretch in the second direction X can be determined by analyzing the amount of change in capacitance between the first direction driving electrode bar 112*e* and the first direction mono-receiving electrode bar 121*e*.

For example, as the amount of change in capacitance increases, it can be determined that the stretch panel 100 is further stretched in the second direction X.

Moreover, coordinates of an area stretched in the second direction X can be determined using coordinates of a second direction driving electrode 112 to which the stretch driving signal is supplied and coordinates of a mono-receiving electrode RX_X where the change in capacitance is sensed.

Figure 12:
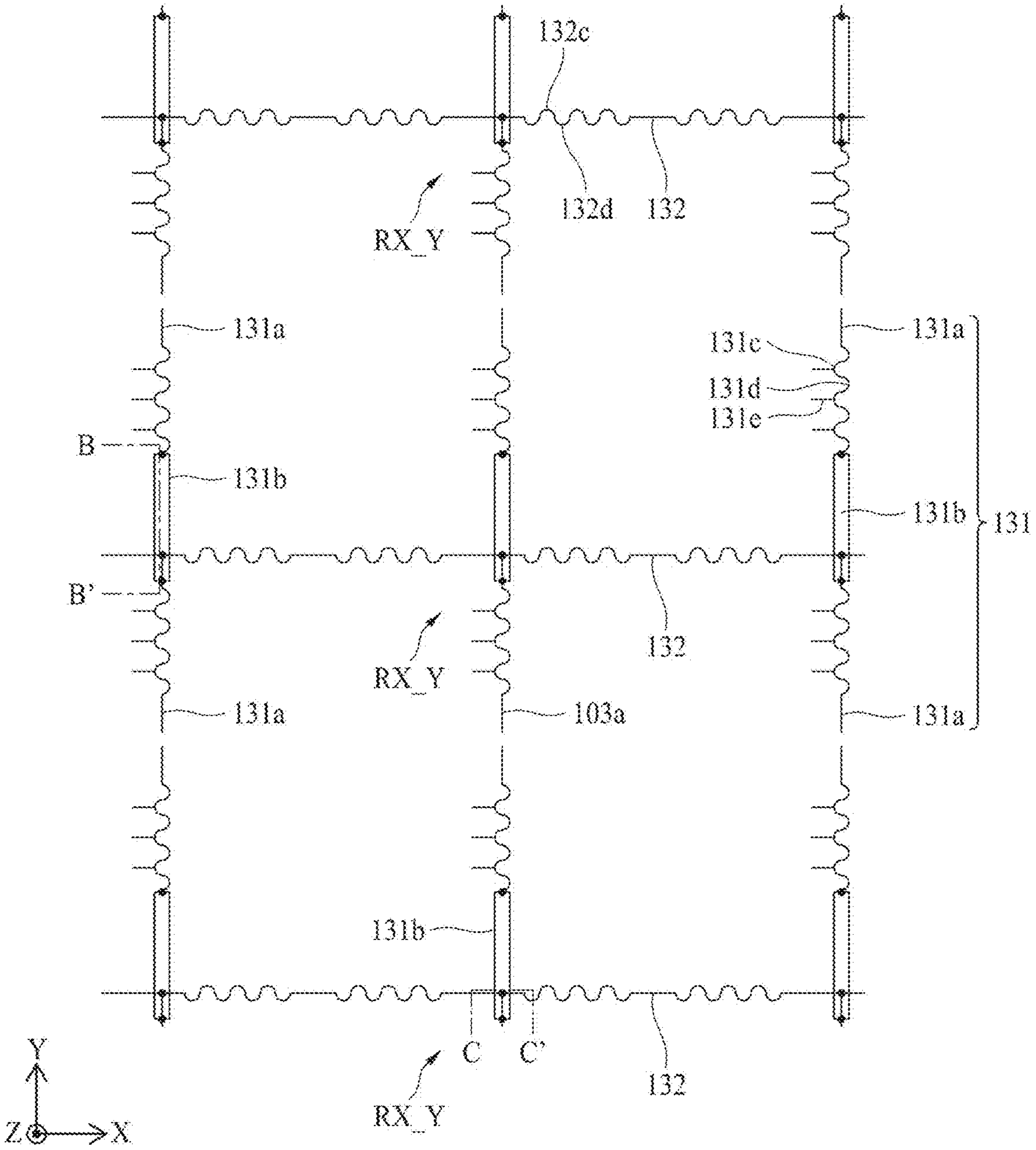
FIG. 12 is an example diagram illustrating a structure of three cross-receiving electrodes illustrated in FIG. 8.
Figure 13:
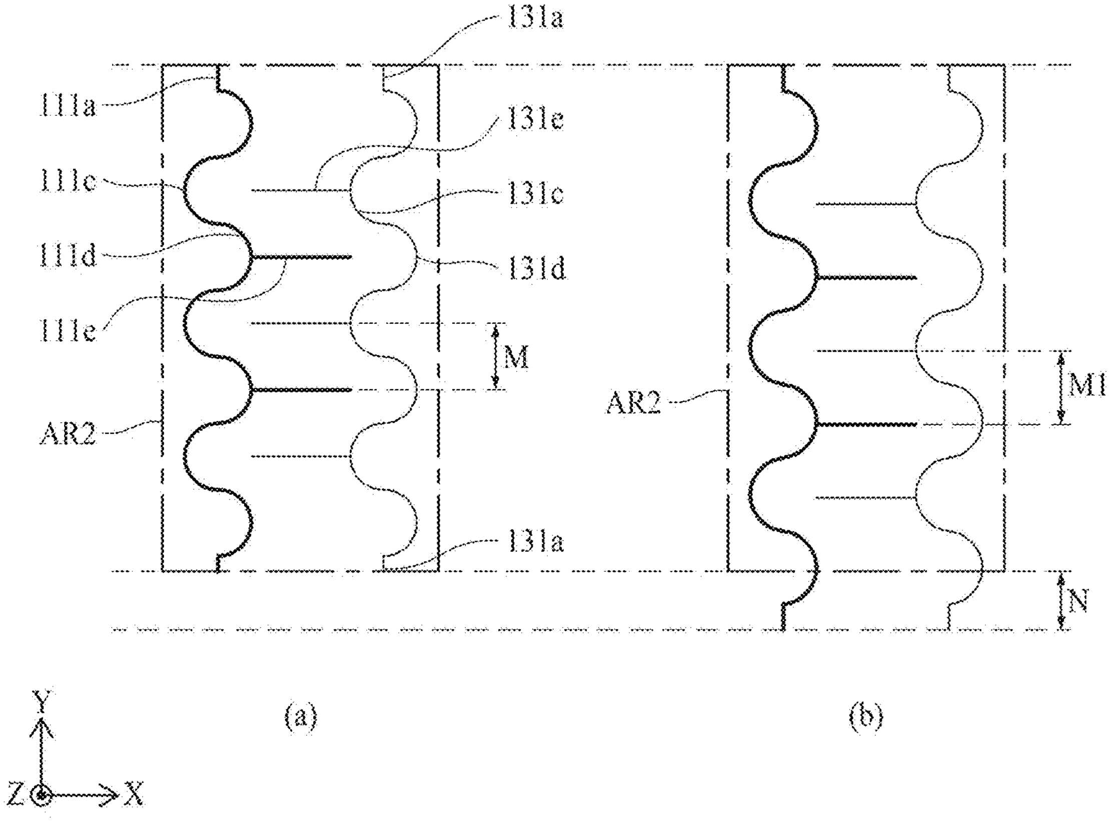
FIG. 13 is an example diagram illustrating a second area illustrated in FIG. 8.

FIG. 12 is an example diagram illustrating a structure of three cross-receiving electrodes illustrated in FIG. 8, and FIG. 13 is an example diagram illustrating a second area illustrated in FIG. 8. In particular, (a) of FIG. 13 illustrates a state in which the first direction driving electrode branch 111*a* and the first direction cross-receiving electrode branch 131*a* are not stretched, and (b) of FIG. 13 illustrates a state in which the first direction driving electrode branch 111*a* and the first direction cross-receiving electrode branch 131*a* are stretched.

First, each of the cross-receiving electrodes RX_Y can extend in the first direction Y and the second direction X of the stretch support substrate 101, as described above.

For example, each of the cross-receiving electrodes RX_Y can include a second direction cross-receiving electrode 132 extending in the second direction X and a first direction cross-receiving electrode 131 connected to the second direction cross-receiving electrode 132 and extending in the first direction Y, as illustrated in FIGS. 7, 8, and 12.

The second direction cross-receiving electrode 132 can extend from the left end to the right end of the stretch panel 100 and can be connected to the stretch driver 60.

At least two first direction cross-receiving electrodes 131 can be connected to the second direction cross-receiving electrode 132.

Each of the first direction cross-receiving electrodes 131 is connected to the second direction cross-receiving electrode 132.

Next, each of the first direction cross-receiving electrodes 131 and the second direction cross-receiving electrodes 132 have a cross shape.

For example, as illustrated in FIG. 12, the first direction cross-receiving electrode 131 and the second direction cross-receiving electrode 132 intersect each other, and accordingly, the first direction cross-receiving electrode 131 and the second direction cross-receiving electrode 132 have the cross shape.

For example, the second direction cross-receiving electrode 132 extends from the left end to the right end of the stretch area 109*a* illustrated in FIG. 7 and is connected to the stretch driver 60.

For example, the first direction cross-receiving electrode 131 extends along the first direction Y in a part of the stretch area 109*a* illustrated in FIG. 7.

In this case, the first direction cross-receiving electrodes 131 adjacent to each other along the first direction Y are spaced apart from each other.

For example, at least two first direction cross-receiving electrodes 131 can be provided along the first direction Y of the stretch panel 100, at least two first direction cross-receiving electrodes 131 can be spaced apart from each other, and at least two first direction cross-receiving electrodes 131 can be arranged in a vertical row.

Next, each of the first direction cross-receiving electrodes 131 includes two first direction cross-receiving electrode branches 131*a* adjacent to each other and a cross-receiving electrode bridge 131*b* connecting the two first direction cross-receiving electrode branches 131*a*.

For example, two first direction cross-receiving electrode branches 131*a* are connected to the cross-receiving electrode bridge 131*b*, and the two first direction cross-receiving electrode branches 131*a* extend in the first direction Y.

The two first direction cross-receiving electrode branches 131*a* can be formed on the same layer as the cross-receiving electrode bridge 131*b*, can be provided at both ends of the cross-receiving electrode bridge 131*b*, and can be connected to the cross-receiving electrode bridge 131*b*.

For example, a cross-sectional surface taken along line B-B' illustrated in FIG. 12 can be a cross-sectional surface B-B' illustrated in FIG. 6.

In this case, in the cross-sectional surface B-B' of FIG. 6, the bridge 106 can be the cross-receiving electrode bridge 131*b*, and the metal electrode 104 can be the first direction cross-receiving electrode branch 131*a*.

For example, as illustrated in FIGS. 6 and 12, the cross-receiving electrode bridge 131*b* can be provided on the upper surface of the mesh portion 103*a*, the cross-receiving electrode bridge 131*b* can be covered by the bridge insulation layer 107, and the first direction cross-receiving electrode branches 131*a* can be connected to the cross-receiving electrode bridge 131*b* at both ends of the cross-receiving electrode bridge 131*b*.

To provide an additional description, the first direction cross-receiving electrode branches 131*a* are electrically connected through the cross-receiving electrode bridge 131*b*.

In this case, in the cross-sectional surface B-B' of FIG. 6, another metal electrode 104 provided between two metal electrode 104, for example, the two first direction cross-receiving electrode branches 131*a* can be the mono-receiving electrode RX_X, referring to FIGS. 8 and 12. For example, the mono-receiving electrode RX_X can overlap the cross-receiving electrode bridge 131*b* with the bridge insulation layer 107 interposed therebetween, and thus is not connected to the cross-receiving electrode bridge 131*b*.

In this case, the second direction cross-receiving electrode 132 can be connected to the cross-receiving electrode bridge 131*b* through a contact hole formed in the bridge insulation layer covering the cross-receiving electrode bridge 131*b*, or, as illustrated in FIGS. 6 and 12, can be connected to the cross-receiving electrode bridge 131*b* through the first direction cross-receiving electrode branch 131*a*.

Further, a cross-sectional surface taken along a line C-C' illustrated in FIG. 12 can be the cross-sectional surface C-C' illustrated in FIG. 6.

For example, as described with reference to FIG. 6, the stretch support substrate 101 can be connected to the stretch substrate 103 through the adhesive 102.

The stretch substrate 103 can include mesh portions 103*a* connected like a mesh, and opening portions 103*b* are formed between the mesh portions 103*a*.

To provide an additional description, the stretch substrate 103 can be provided between the stretch support substrate 101 and the driving electrodes TX, mono-receiving electrodes RX_X, and cross-receiving electrodes RX_Y.

The stretch substrate 103 includes mesh portions 103*a* connected like a mesh, and opening portions 103*b* can be formed between the mesh portions 103*a*.

In this case, the driving electrodes TX, the mono-receiving electrodes RX_X, and the cross-receiving electrodes RX_Y can be provided only in the mesh portions 103*a*.

In this case, in the cross-sectional surface C-C' of FIG. 6, the bridge 106 can be the cross-receiving electrode bridge 131*b*, and the metal electrode 104 can be the second direction cross-receiving electrode 132.

For example, as illustrated in FIG. 6, the cross-receiving electrode bridge 131*b* can be provided on the upper surface of the mesh portion 103*a*, the cross-receiving electrode bridge 131*b* can be covered by the bridge insulation layer 107, and the second direction cross-receiving electrode 132 can be connected to the cross-receiving electrode bridge 111*b* through a contact hole formed in the bridge insulation layer 107 covering the cross-receiving electrode bridge 131*b*.

To provide an additional description, the second direction cross-receiving electrodes 132 and the first direction cross-receiving electrodes 131 are electrically connected through cross-receiving electrode bridges 131*b*.

Accordingly, the cross-receiving electrode RX_X including the first direction cross-receiving electrode branches 131*a*, the cross-receiving electrode bridges 131*b*, and the second direction cross-receiving electrode 132 can be used as one electrode.

Next, as described above, each of the first direction cross-receiving electrodes 131 includes two first direction cross-receiving electrode branches 131*a* adjacent to each other and the cross-receiving electrode bridge 131*b* connecting the two first direction cross-receiving electrode branches 131.

In this case, each of the two first direction cross-receiving electrode branches 131*a* can have a rounded shape having a mountain 131*c* and a valley 131*d*, as illustrated in FIG. 12.

For example, in the first direction cross-receiving electrode branch 131*a* illustrated in FIG. 12, the mountain 131*c* can mean a portion protruding in the left direction, and the valley 131*d* can mean a portion protruding in the right direction.

For example, the first direction cross-receiving electrode branch 131*a* can include at least one mountain 131*c* protruding in the left direction and at least one valley 131*d* protruding in the right direction, and thus can have the rounded shape.

Because the first direction cross-receiving electrode branch 131*a* has, as described above, the rounded shape having the mountain 131*c* and the valley 131*d* provided along the first direction Y, the first direction cross-receiving electrode branch 131*a* can be stretched along the first direction Y.

In this case, as illustrated in FIG. 12, a second direction cross-receiving electrode bar 131*e* protruding in the second direction X is provided in the mountain 131*c* provided in the first direction cross-receiving electrode branch 131*a*.

The second direction cross-receiving electrode bar 131*e* extends in a direction opposite to the direction in which the valley 131*d* is located. For example, the second direction cross-receiving electrode bar 131*e* can protrude from the mountain 131*c* in the left direction of the mountain 131*c*, as illustrated in FIG. 12.

Next, the second direction cross-receiving electrode 132 has a rounded shape having a mountain 132*c* and a valley 132*d*.

For example, in the second direction cross-receiving electrode 132 illustrated in FIG. 12, the mountain 132*c* can mean a portion protruding in an upper direction, and the valley 132*d* can mean a portion protruding in a lower direction.

For example, the second direction cross-receiving electrode 132 can include at least one mountain 132*c* protruding in the upper direction and at least one valley 132*d* protruding in the lower direction, and thus can have the rounded shape.

Because the second direction cross-receiving electrode 132 has, as described above, the rounded shape having the mountain 132*c* and the valley 132*d* provided along the second direction X, the second direction cross-receiving electrode 132 can be stretched along the second direction X.

Next, among the second direction driving electrodes 112 provided in the driving electrodes TX provided along the second direction X, the second direction driving electrodes 112 adjacent along the second direction X can be spaced apart from each other by a certain interval and can be provided in a row.

For example, as illustrated in FIGS. 8 and 9, the driving electrodes TX can be provided along the second direction X. In this case, the driving electrodes TX spaced apart along the second direction X are independently driven.

Therefore, among the second direction driving electrodes 112 provided in the driving electrodes TX provided along the second direction X, the second direction driving electrodes 112 adjacent along the second direction X are spaced apart from each other by a certain interval.

Further, among the second direction driving electrodes 112 provided in the driving electrodes TX provided along the second direction X, the second direction driving electrodes 112 adjacent along the second direction X can be provided in a row.

Each of the second direction cross-receiving electrodes 132 extends from the left end to the right end of the stretch area 109*a*.

In this case, the second direction cross-receiving electrode 132 is provided in parallel with the second direction driving electrodes 112 provided in a row.

For example, the second direction driving electrodes 112 provided in a row can be provided on the same layer as the second direction cross-receiving electrode 132 and can be provided in parallel with the second direction cross-receiving electrode 132.

To provide an additional description, one second direction cross-receiving electrode 132 can be provided parallel to at least two second direction driving electrodes 112.

Next, among the first direction cross-receiving electrodes 131 provided in the cross-receiving electrodes RX_Y provided along the first direction Y, the first direction cross-receiving electrodes 131 adjacent along the first direction can be spaced apart from each other by a certain interval and can be provided in a vertical row.

For example, as illustrated in FIG. 12, the cross-receiving electrodes RX_Y can be provided along the first direction Y. In this case, the cross-receiving electrodes RX_Y spaced apart along the first direction Y are independently driven.

Therefore, among the first direction cross-receiving electrodes 131 provided in the cross-receiving electrode RX_Y provided along the first direction Y, the first direction cross-receiving electrodes 131 adjacent along the first direction Y are spaced apart from each other by a certain interval.

Further, among the first direction cross-receiving electrodes 131 provided in the cross-receiving electrodes RX_Y provided along the first direction Y, the first direction cross-receiving electrodes 131 adjacent along the first direction Y can be provided in a vertical row.

Each of the first direction driving electrodes 111 extends from the upper end to the lower end of the stretch area 109*a*.

In this case, the first direction driving electrodes 111 are provided parallel to the first direction cross-receiving electrodes 131 provided in a vertical row.

For example, the first direction cross-receiving electrodes 131 provided in a vertical row can be provided on the same layer as the first direction driving electrode 111 and can be provided in parallel with the first direction driving electrode 111.

To provide an additional description, one first direction driving electrode 111 can be provided parallel to at least two first direction cross-receiving electrodes 131.

Next, as described above, the first direction driving electrode 111 can have the rounded shape having the mountain 111*c* and the valley 111*d*, and the valley 111*d* can be provided with the second direction driving electrode bar 111*e* protruding in the second direction X.

Further, each of the first direction cross-receiving electrodes 131 provided parallel to the first direction driving electrode 111 can have the rounded shape having the mountain 131*c* and the valley 131*d*, and the mountain 131*d* can be provided with the second direction cross-receiving electrode bar 131*e* protruding in the second direction X.

In this case, the second direction driving electrode bar 111*e* and the second direction cross-receiving electrode bar 131*e* can be provided adjacent to each other along the first direction Y, as illustrated in a second area AR2 of FIGS. 8 and 13.

Finally, the second direction driving electrode bar 111*e* can be provided in the valley 111*d* of the first direction driving electrode 111, and can protrude toward the valley 131*d* of the first direction cross-receiving electrode 131 adjacent to the second direction driving electrode bar 111*e*, as illustrated in (a) and (b) of FIG. 13.

In particular, the second direction driving electrode bar 111*e* provided in the first direction driving electrode branch 111*a* can protrude toward the valley 131*d* of the first direction cross-receiving electrode branch 131*a*.

In this case, the second direction cross-receiving electrode bar 131*e* provided on the mountain 131*c* of the first direction cross-receiving electrode branch 131*a* adjacent to the second direction driving electrode bar 111*e* can protrude toward the mountain 111*c* of the first direction driving electrode branch 111*a*.

For example, the mountain 111*c* of the first direction driving electrode branch 111*a* and the mountain 131*c* of the first direction cross-receiving electrode branch 131*a* can be arranged in a row along the second direction X, and the valley 111*d* of the first direction driving electrode branch 111*a* and the valley 131*d* of the first direction cross-receiving electrode branch 131*a* can be arranged in a row along the second direction X.

Therefore, the second direction driving electrode bar 111*e* and the second direction cross-receiving electrode bar 131*e* can be provided adjacent to each other along the first direction Y.

A method of determining whether the stretch panel 100 is stretched along the first direction Y will be described with reference to FIG. 12.

For example, as described above, the stretch driver 60 sequentially supplies stretch driving signals to the driving electrodes TX.

In this case, if there is no stretch, as illustrated in (a) of FIG. 13, the distance M between the second direction driving electrode bar 111*e* and the second direction cross-receiving electrode bar 131*e* remains constant.

However, as illustrated in (b) of FIG. 13, when the stretch panel 100 is stretched in the first direction Y, the first direction driving electrode branch 111*a* of the first direction driving electrode 111 and the first direction cross-receiving electrode branch 131*a* of the first direction cross-receiving electrode 131 can be stretched by N.

In this case, a distance M between the second direction driving electrode bar 111*e* and the second direction cross-receiving electrode bar 131*e* also increases.

For example, a distance M1 between the second direction driving electrode bar 111*e* and the second direction cross-receiving electrode bar 131*e* after the first direction driving electrode branch 111*a* and the first direction cross-receiving electrode branch 131*a* are stretched by N in the first direction Y is greater than the distance M1 between the second direction driving electrode bar 111*e* and the second direction cross-receiving electrode bar 131*e* before the first direction driving electrode branch 111*a* and the first direction cross-receiving electrode branch 131*a* is stretched in the first direction Y.

A capacitance formed between the second direction driving electrode bar 111*e* and the second direction cross-receiving electrode bar 131*e* varies based on a distance between the second direction driving electrode bar 111*e* and the second direction cross-receiving electrode bar 131*e*.

Therefore, by analyzing the capacitance between the second direction driving electrode bar 111*e* and the second direction cross-receiving electrode bar 131*e* illustrated in (a) of FIG. 13 and the capacitance between the second direction driving electrode bar 111*e* and the second direction cross-receiving electrode bar 131*e* illustrated in (b) of FIG. 13, it can be determined whether or not it is stretched in the first direction Y.

For example, when the capacitance increases or decreases, it can be determined that the stretch panel 100 is stretched in the first direction Y.

Further, by analyzing the amount of change in capacitance between the second direction driving electrode bar 111*e* and the second direction cross-receiving electrode bar 131*e*, the degree of stretch in the first direction Y can be determined.

For example, as the amount of change in capacitance increases, it can be determined that the stretch panel 100 is further stretched in the first direction Y.

Further, by using the coordinates of the first direction driving electrode branch 111*a* to which the stretch driving signal is supplied and the coordinates of the first direction cross-receiving electrode branch 131*a* in which the change in capacitance is sensed, the coordinates of an area stretched in the first direction Y can be determined.

Figure 14:
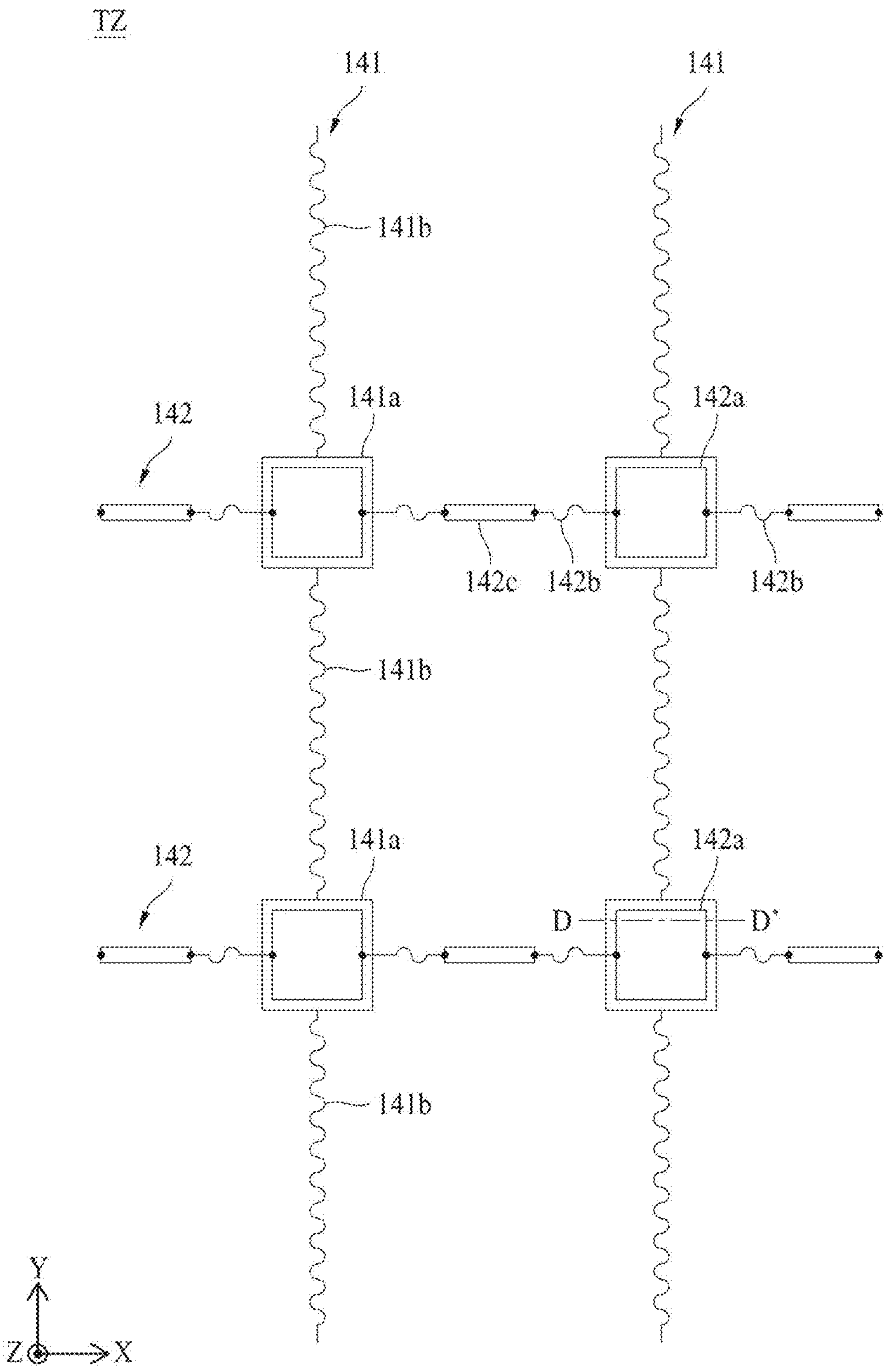
FIG. 14 is an example diagram illustrating a Z-axis stretch electrode applied to an apparatus for sensing a stretch according to an embodiment of the present disclosure.
Figure 15A:
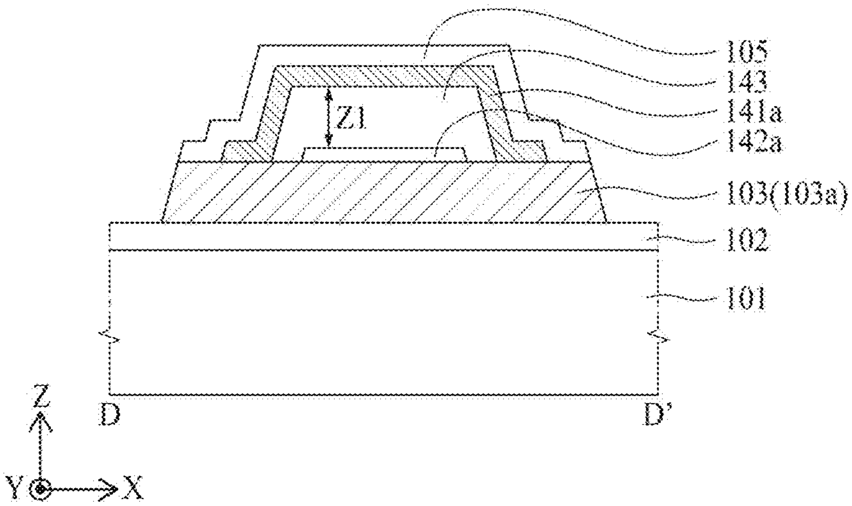
FIGS. 15A and 15B are example diagrams illustrating a cross-sectional surface taken along a line D-D' illustrated in FIG. 14.
Figure 15B:
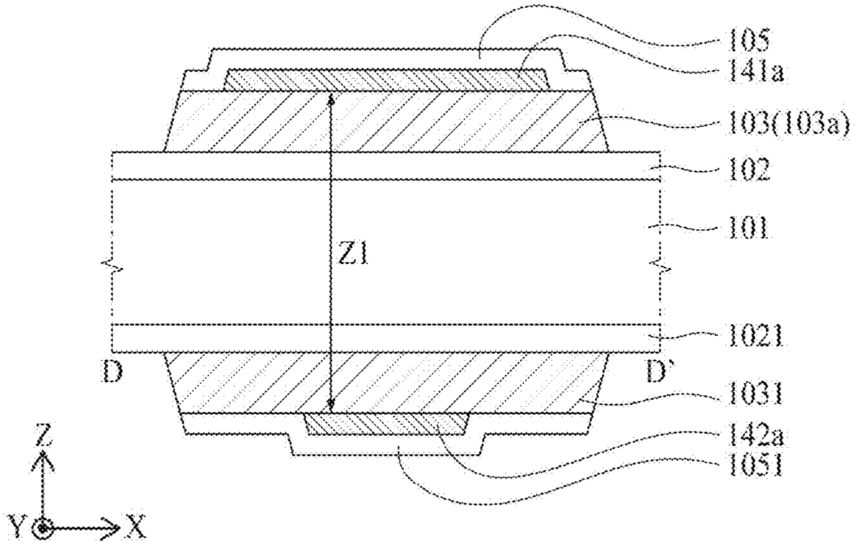
Figure 16:
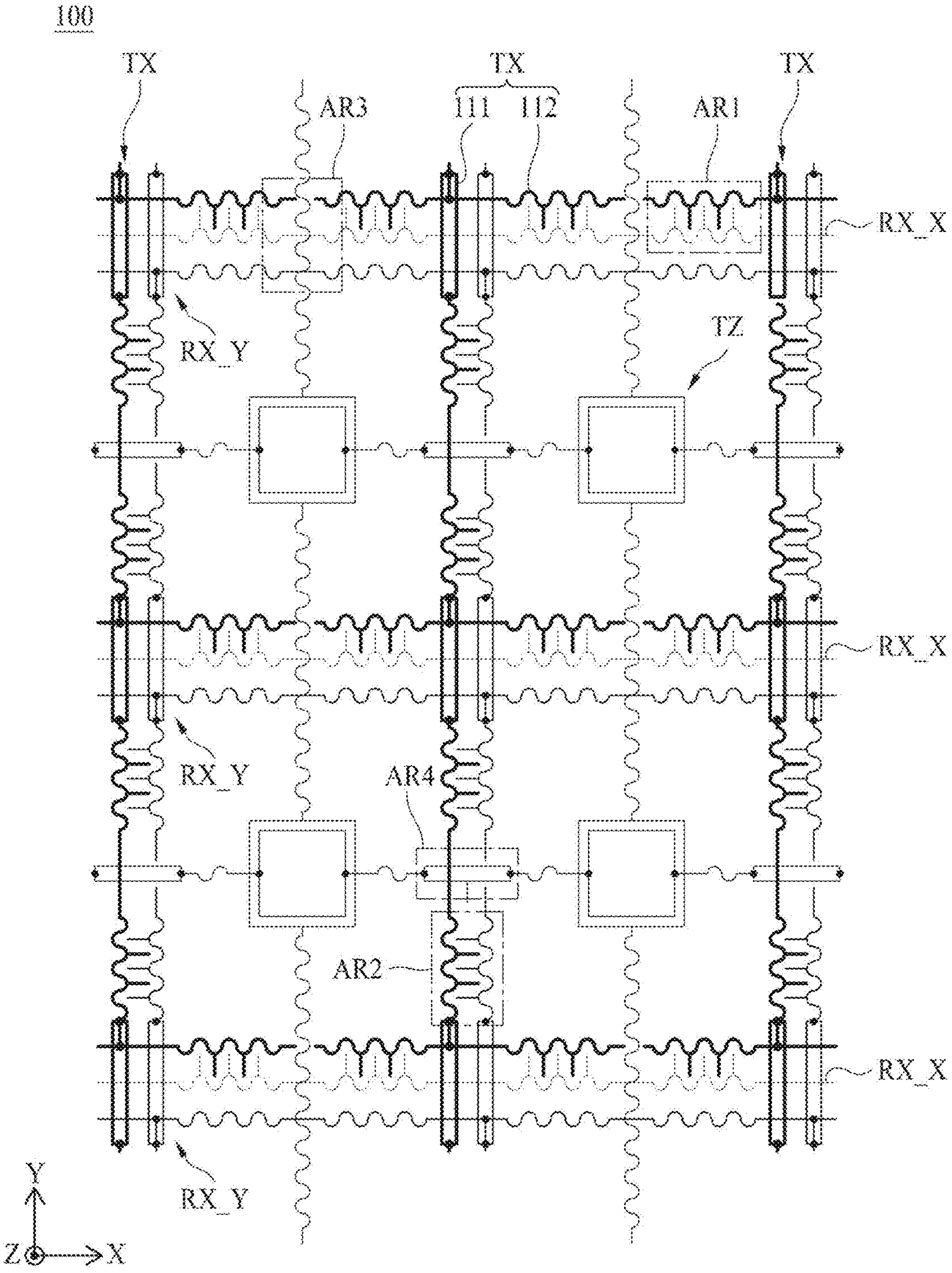
FIG. 16 is an example diagram illustrating three driving electrodes, three mono-receiving electrodes, three cross-receiving electrodes, and a Z-axis stretch electrode provided in a stretch panel of an apparatus for sensing a stretch according to an embodiment of the present disclosure.

FIG. 14 is an example diagram illustrating a Z-axis stretch electrode applied to an apparatus for sensing a stretch according to an embodiment of the present disclosure, FIGS. 15A and 15B are example diagrams illustrating a cross-sectional surface taken along a line D-D' illustrated in FIG. 14, and FIG. 16 is an example diagram illustrating three driving electrodes, three mono-receiving electrodes, three cross-receiving electrodes, and a Z-axis stretch electrode provided in a stretch panel of an apparatus for sensing a stretch according to an embodiment of the present disclosure. In the following descriptions, details that are the same as or similar to details described with reference to FIGS. 1 to 13 are omitted or briefly described.

As described above, an apparatus for sensing a stretch according to an embodiment of the present disclosure can sense whether a stretch panel is stretched using driving electrodes TX, mono-receiving electrodes RX_X, and cross-receiving electrodes RX_Y, and for example, can sense stretch in the first direction Y and stretch in the second direction X.

Further, an apparatus for sensing a stretch according to an embodiment of the present disclosure can further include a Z-axis stretch electrode TZ illustrated in FIG. 14 in order to further sense stretch in a third direction (e.g., a Z-axis direction) perpendicular to the first direction Y and the second direction X. In the following description, the third direction can be represented by the reference numeral Z.

For example, when the stretch panel 100 is stretched in the second direction X, the lengths of the second direction driving electrode 112 and the mono-receiving electrode RX_X increases as described with reference to FIG. 11, and thus the distance F between the first direction driving electrode bar 112*e* and the first direction mono-receiving electrode bar 121*e* is changed. Accordingly, the capacitance between the first direction driving electrode bar 112*e* and the first direction mono-receiving electrode bar 121*e* is changed.

The stretch driver 60 can analyze the magnitude of the capacitance changed between the first direction driving electrode bar 112*e* and the first direction mono-receiving electrode bar 121*e* to determine whether it is stretched in the second direction X and the degree of stretch in the second direction X.

In this case, when the stretch panel 100 is stretched in the second direction X, an area of the stretch panel 100 can increase and a height of the stretch panel 100 in an area where stretch has occurred can decrease.

Further, as described with reference to (a) and (b) of FIG. 13, when the stretch panel 100 is stretched in the first direction Y, an area of the stretch panel 100 can increase and a height of the stretch panel 100 in an area where stretch has occurred can decrease.

For example, when the stretch panel 100 is stretched in the second direction X or the first direction Y, a pressure can be applied to the stretch panel 100 in the third direction Z, and accordingly, a height of the stretch panel 100 in the third direction Z can be reduced.

In particular, a height in the third direction Z in an area where stretch is directly generated in the stretch panel 100 can be smaller than a height in the third direction Z around the area where stretch is directly generated in the stretch panel 100.

Therefore, if the amount of change in a height of the stretch panel 100 in the third direction Z is sensed, the stretch degree can be more accurately determined.

To this end, an apparatus for sensing a stretch according to an embodiment of the present disclosure can further include the Z-axis stretch electrode TZ as illustrated in FIGS. 14, 15A, and 15B.

First, the stretch panel 100 applied to an apparatus for sensing a stretch according to an embodiment of the present disclosure can further include a main pressure electrodes 141*a* provided on the stretch support substrate 101, an auxiliary pressure electrodes 142*a* provided to overlap the main pressure electrodes 141*a* in a third direction Z perpendicular to the first direction Y and the second direction X with a Z-axis insulation layer 143 interposed therebetween, main pressure electrode lines 141*b* connecting the main pressure electrodes 141*a* provided along the first direction Y among the main pressure electrodes 141*a*, and auxiliary pressure electrode lines 142*b* connecting the auxiliary pressure electrodes 142*a* provided along the second direction X among the auxiliary pressure electrodes 142*a*.

For example, the Z-axis stretch electrode TZ can further include the main pressure electrodes 141*a*, the auxiliary pressure electrodes 142*a*, the main pressure electrode lines 141*b*, and the auxiliary pressure electrode lines 142*b*.

The main pressure electrodes 141*a* provided along the first direction Y among the main pressure electrodes 141*a*, and the main pressure electrode lines 141*b* connecting the main pressure electrodes 141*a* can be included in a main electrode 141.

The auxiliary pressure electrodes 142*a* provided along the second direction X among the auxiliary pressure electrodes 142*a* and the auxiliary pressure electrode lines 142*b* connecting the auxiliary pressure electrodes 142*a* can be included in an auxiliary electrode 142.

For example, the Z-axis stretch electrode TZ can include the main electrode 141 and the auxiliary electrodes 142.

In particular, the Z-axis stretch electrode TZ can include at least two main electrodes 141 and at least two auxiliary electrodes 142.

Next, as illustrated in FIG. 14, each of the main electrodes 141 can extend along the first direction Y, and the main electrodes 141 can be spaced apart along the second direction X.

Further, each of the auxiliary electrodes 142 can extend along the second direction X, as illustrated in FIG. 14, and the auxiliary electrodes 142 can be spaced apart along the first direction Y.

In this case, as illustrated in FIGS. 15A and 15B, the main pressure electrode 141*a* and the auxiliary pressure electrode 142*a* can overlap each other in the third direction Z with the Z-axis insulation layer 143 therebetween.

For example, as illustrated in FIG. 15A, the stretch support substrate 101 can be bonded to the stretch substrate 103 through an adhesive 102, the auxiliary pressure electrode 142*a* can be provided on an upper surface of the stretch substrate 103, the auxiliary pressure electrode 142*a* can be covered by the Z-axis insulation layer 143, the main pressure electrode 141*a* can be provided on an upper surface of the Z-axis insulation layer 143, and the main pressure electrode 141*a* can be covered by a stretch passivation layer 105.

In this case, the stretch support substrate 101, the adhesive 102, the stretch substrate 103, and the stretch passivation layer 105 illustrated in FIG. 15A can correspond to the stretch support substrate 101, the adhesive 102, the stretch substrate 103, and the stretch passivation layer 105 described with reference to FIG. 6.

Moreover, the auxiliary pressure electrode 142*a* illustrated in FIG. 15A can be provided on the same layer as the bridge 106 described with reference to FIG. 6, for example, on the same layer as the driving electrode bridge 111*b* and the cross-receiving electrode bridge 131*b*.

Further, the main pressure electrode 141*a* illustrated in FIG. 15A can be provided on the same layer as the metal electrode 104 described with reference to FIG. 6, for example, on the same layer as the second direction driving electrode 112, the mono-receiving electrode RX_X, and the second direction cross-receiving electrode 132.

Furthermore, a stretch panel 100, in which the main pressure electrode 141*a* is provided on the auxiliary pressure electrode 142*a*, is illustrated in FIG. 15A but the auxiliary pressure electrode 142*a* can be provided on the main pressure electrode 141*a*.

Further, as described with reference to FIG. 6, the stretch substrate 103 can include mesh portions 103*a* connected like a mesh, and opening portions 103*b* can be formed between the mesh portions 103*a*.

In this case, the main pressure electrode 141*a* and the auxiliary pressure electrode 141*b* can be provided only in the mesh portion 103*a*.

The main pressure electrode lines 141*b* can also be provided on the upper surface of the stretch substrate 103, and particularly, as illustrated in FIG. 14, in the first direction Y. The main pressure electrode lines 141*b* can be connected to the main pressure electrode 141*a*, and accordingly, the main electrode 141 can be formed.

The auxiliary pressure electrode lines 142*b* can also be provided on the upper surface of the stretch substrate 103, and particularly, as illustrated in FIG. 14, in the second direction X. The auxiliary pressure electrode lines 142*b* can be connected to the auxiliary pressure electrode 142*a*, and accordingly, the auxiliary electrode 142 can be formed.

The sizes of the main pressure electrode 141*a* and the auxiliary pressure electrode 142*a* can be the same or different. In this case, the size of the main pressure electrode 141*a* can be larger than the size of the auxiliary pressure electrode 142*a*, or the size of the auxiliary pressure electrode 142*a* can be larger than the size of the main pressure electrode 141*a*.

Further, as illustrated in FIG. 15B, a first surface (for example, an upper surface) of the stretch support substrate 101 can be bonded to a stretch substrate 103 through an adhesive 102, the main pressure electrode 141*a* can be provided on an upper surface of the stretch substrate 103, and the main pressure electrode 141*a* can be covered by a stretch passivation layer 105. A second surface (for example, a lower surface) of the stretch support substrate 101 opposite to the first surface can be bonded to a lower stretch substrate 1031 through a lower adhesive 1021, the auxiliary pressure electrode 142*a* can be provided on a lower surface of the lower stretch substrate 1031, and the auxiliary pressure electrode 142*b* can be covered by a lower stretch passivation layer 1051.

In this case, the stretch support substrate 101, the adhesive 102, the stretch substrate 103, and the stretch passivation layer 105 illustrated in FIG. 15B can correspond to the stretch support substrate 101, the adhesive 102, the stretch substrate 103, and the stretch passivation layer 105 described with reference to FIG. 6.

Also, the main pressure electrode 141*a* illustrated in FIG. 15B can be provided on the same layer as the bridge 106 described with reference to FIG. 6, for example, on the same layer as the driving electrode bridge 111*b* and the cross-receiving electrode bridge 131*b*.

Moreover, the lower adhesive 1021, the lower stretch substrate 1031, and the lower stretch passivation layer 1051 illustrated in FIG. 15B can correspond to the adhesive 102, the stretch substrate 103, and the stretch passivation layer 105.

Further, FIG. 15B illustrates a stretch panel 100 in which the main pressure electrode 141*a* is provided on the stretch support substrate 101 and the auxiliary pressure electrode 142*a* is provided at a lower end of the stretch support substrate 101. However, the main pressure electrode 141*a* can be provided at a lower end of the stretch support substrate 101 and the auxiliary pressure electrode 142*a* can be provided at an upper end of the stretch support substrate 101.

Also, as described with reference to FIG. 15A, the main pressure electrode 141*a* can be provided only in the mesh portion 103*a* of the stretch substrate 103, and the auxiliary pressure electrode 142*a* can be provided only in the mesh portion of the lower stretch substrate 1031.

The main pressure electrode lines 141*b* can be provided on the upper surface of the stretch substrate 103, and particularly, as illustrated in FIG. 14, in the first direction Y. The main pressure electrode lines 141*b* can be connected to the main pressure electrode 141*a*, and thus the main electrode 141 can be formed.

The auxiliary pressure electrode lines 142*b* can be provided on a lower surface of the lower stretch substrate 1031, and particularly, as illustrated in FIG. 14, in the second direction X. The auxiliary pressure electrode lines 142*b* can be connected to the auxiliary pressure electrode 142*a*, and accordingly, the auxiliary electrode 142 can be formed.

Next, each of the main pressure electrode lines 141*b* and auxiliary pressure electrode lines 142*b* can have the rounded shape having the mountains and valleys.

For example, in the main pressure electrode line 141*b* illustrated in FIG. 14, the mountain means a portion protruding in the left direction, and the valley means a portion protruding in the right direction.

For example, the main pressure electrode line 141*b* can include at least one mountain protruding in the left direction and at least one valley protruding in the right direction, and thus can have the rounded shape.

Because the main pressure electrode line 141*b* has, as described above, the rounded shape with the mountain and valley provided along the first direction Y, the main pressure electrode line 141*b* can be stretched along the first direction Y.

Also, in the auxiliary pressure electrode line 142*b* illustrated in FIG. 14, the mountain means a portion protruding in the upper direction, and the valley means a portion protruding in the lower direction.

For example, the auxiliary pressure electrode line 142*b* can include at least one mountain protruding in the upper direction and at least one valley protruding in the lower direction, and thus can have the rounded shape.

Because the auxiliary pressure electrode line 142*b* has, as described above, the rounded shape with the mountain and valley provided along the second direction X, the auxiliary pressure electrode line 142*b* can be stretched along the second direction X.

Next, as illustrated in FIG. 16, the main pressure electrode 141*a* and the auxiliary pressure electrode 142*a* can be provided in an area where the driving electrodes TX, the mono-receiving electrodes RX_X and the cross-receiving electrodes RX_Y are not provided.

The main pressure electrode line 141*b* is provided along the first direction Y, and the second direction driving electrode 112, the mono-receiving electrode RX_X, and the second direction cross-receiving electrode 132 are provided along the second direction X.

Therefore, the main pressure electrode line 141*b* can be adjacent to the second direction driving electrode 112, the mono-receiving electrode RX_X, and the second direction cross-receiving electrode 132, and particularly, can intersect the mono-receiving electrode RX_X and the second direction cross-receiving electrode 132.

Accordingly, as illustrated in FIG. 16, in a third area AR3 where the main pressure electrode line 141*b* intersects the mono-receiving electrode RX_X and the second direction cross-receiving electrode 132, the main pressure electrode line 141*b* can overlap the mono-receiving electrode RX_X and the second direction cross-receiving electrode 132 with an insulation layer interposed therebetween.

For example, an insulation layer corresponding to the Z-axis insulation layer 143 described with reference to FIGS. 15A and 15B can be provided in the third area AR3 in which the main pressure electrode line 141*b* overlaps the mono-receiving electrode RX_X and the second direction cross-receiving electrode 132.

In this case, the main pressure electrode line 141*b* can be provided at a lower end of an insulation layer provided in the third area AR3, and the mono-receiving electrode RX_X and the second direction cross-receiving electrode 132 can be provided at an upper end of an insulation layer provided in the third area AR3.

However, the main pressure electrode line 141*b* can be provided at an upper end of the insulation layer provided in the third area AR3, and the mono-receiving electrode RX_X and the second direction cross-receiving electrode 132 can be provided at a lower end of the insulation layer provided in the third area AR3.

Further, a Z-axis bridge can be provided in the third area AR3 to connect the main pressure electrode lines 141*b* connected to different main pressure electrodes 141*a*.

For example, the Z-axis bridge can be provided on a different layer from the main pressure electrode lines 141*b*, the mono-receiving electrode RX_X, and the second direction cross-receiving electrode 132 with an insulation layer therebetween. In this case, the main pressure electrode lines 141*b* can be connected to the Z-axis bridge through a contact hole provided in the insulation layer, and thus two main pressure electrode lines 141*b* connected to different main pressure electrodes 141*a* can be connected to each other through the Z-axis bridge. However, the main pressure electrode lines 141*b* can be directly connected to the Z-axis bridge at an end of the Z-axis bridge.

The second direction driving electrodes 112 can be provided to be spaced apart from each other in the third area AR3.

The auxiliary pressure electrode line 142*b* is provided along the second direction X, and the first direction driving electrode 111 and the first direction cross-receiving electrode 131 are provided along the first direction Y.

Therefore, the auxiliary pressure electrode line 142*b* can be adjacent to the first direction driving electrode 111 and the first direction cross-receiving electrode 131, and in particular, can intersect the first direction driving electrode 111.

Therefore, as illustrated in FIG. 16, in a fourth area AR4 where the auxiliary pressure electrode line 142*b* intersects the first direction driving electrode 111, the auxiliary pressure electrode line 142*b* can overlap the first direction driving electrode 111 with an insulation layer interposed therebetween.

For example, an insulation layer corresponding to the Z-axis insulation layer 143 described with reference to FIGS. 15A and 15B can be provided in the fourth area AR4 where the auxiliary pressure electrode line 142*b* intersects the first direction driving electrode 111.

In this case, the auxiliary pressure electrode line 142*b* can be provided at a lower end of the insulation layer provided in the fourth area AR4, and the first direction driving electrode 111 can be provided at an upper end of the insulation layer provided in the fourth area AR4.

However, the auxiliary pressure electrode line 142*b* can be provided at an upper end of the insulation layer provided in the fourth area AR4, and the first direction driving electrode 111 can be provided at a lower end of the insulation layer provided in the fourth area AR4.

Also, a Z-axis bridge 142*c* for connecting auxiliary pressure electrode lines 142*b* connected to different auxiliary pressure electrodes 142*a* can be provided in the fourth area AR4, as illustrated in FIGS. 14 and 16.

For example, the Z-axis bridge 142*c* can be provided in a layer different from the auxiliary pressure electrode lines 142*b* and the first direction driving electrode 112 with an insulation layer therebetween. In this case, the auxiliary pressure electrode lines 142*b* can be connected to the Z-axis bridge 142*c* through a contact hole provided in the insulation layer, and thus two auxiliary pressure electrode lines 142*b* connected to different auxiliary pressure electrodes 142*a* can be connected to each other through the Z-axis bridge 142*c*. However, the auxiliary pressure electrode lines 142*b* can be directly connected to the Z-axis bridge at an end of the Z-axis bridge.

The first direction cross-receiving electrodes 131 can be provided to be spaced apart from each other in the fourth area AR4.

Finally, a method of determining whether it is stretched in the third direction Z or whether it is pressured in the third direction Z by using the Z-axis stretch electrode TZ will be described.

For example, as described above, when the stretch panel 100 is stretched in the second direction X or the first direction Y, a pressure can be applied to the stretch panel 100 in the third direction Z, and accordingly, a height of the stretch panel 100 in the third direction Z can be reduced.

When the height of the stretch panel 100 in the third direction Z is reduced, a gap Z1 between the main pressure electrode 141*a* and the auxiliary pressure electrode 142*a* illustrated in FIGS. 15A and 15B can be reduced.

A stretch driving signal can be supplied from the stretch driver 60 to at least one of the main pressure electrode 141*a* and the auxiliary pressure electrode 142*a*, for example, the stretch driving signal can be supplied to the main pressure electrode 141*a*.

Accordingly, capacitance can be formed between the main pressure electrode 141*a* and the auxiliary pressure electrode 142*a*.

In this case, if the stretch panel 100 is stretched in the first direction Y or the second direction X and the height in the third direction Y is reduced, the gap Z1 between the main pressure electrode 141*a* and the auxiliary pressure electrode 142*a* can be reduced, and thus the capacitance between the main pressure electrode 141*a* and the auxiliary pressure electrode 142*a* can be changed.

Accordingly, at least one of current, voltage, and capacitance of a stretch sensing signal received through the auxiliary electrode 142 including the auxiliary pressure electrode 142*a* can be changed.

The stretch driver 60 can analyze the amount of change of at least one of the current, voltage, and capacitance to determine at least one of whether the stretch panel 100 is stretched in the third direction Z, the degree of stretch in the third direction Z, and the stretch coordinates in which stretch occurs in the third direction Z.

In particular, the stretch driver 60 can analyze the stretch sensing signals received through the mono-receiving electrodes RX_X, the cross-receiving electrodes RX_Y, and the auxiliary electrodes 142 to determine at least one of whether it is stretched, the degree of stretch, and the stretch coordinates in which stretch occurs.

Accordingly, more accurate stretch status (e.g., whether it is stretched), stretch degree, and stretch coordinates can be determined.

The features of the apparatus for sensing a stretch according to aspects of the present disclosure are briefly summarized as follows.

An apparatus for sensing a stretch according to an embodiment of the present disclosure comprises: a stretch support substrate configured to be stretched; and a plurality of driving electrodes, a plurality of mono-receiving electrodes, and a plurality of cross-receiving electrodes provided on the stretch support substrate, wherein each of the plurality of driving electrodes includes a first direction driving electrode extending in a first direction of the stretch support substrate and a plurality of second direction driving electrodes connected to the first direction driving electrode and extending in a second direction different from the first direction, each of the plurality of mono-receiving electrodes extends in the second direction, and each of the plurality of cross-receiving electrodes extends in the first direction and the second direction.

The first direction driving electrode and each of the plurality of second direction driving electrodes have a cross shape.

The first direction driving electrode includes two first direction driving electrode branches adjacent to each other and a driving electrode bridge connecting the two first direction driving electrode branches, and the second direction driving electrode is connected to the driving electrode bridge through a contact hole formed in a bridge insulation layer covering the driving electrode bridge.

The first direction driving electrode includes two first direction driving electrode branches adjacent to each other and a driving electrode bridge connecting the two first direction driving electrode branches, each of the two first direction driving electrode branches has a rounded shape including a mountain and a valley, and a second direction driving electrode bar protruding in the second direction is provided in the valley.

Each of the plurality of second direction driving electrodes has a rounded shape including a mountain and a valley, and a first direction driving electrode bar protruding in the first direction is provided in the valley.

Each of the plurality of mono-receiving electrodes has a rounded shape including a mountain and a valley, and a first direction mono-receiving electrode bar protruding in the first direction is provided in the mountain.

Second direction driving electrodes adjacent along the plurality of second direction among second direction driving electrodes provided in the second direction are spaced apart from each other by a certain interval and are provided in a row, and a mono-receiving electrode is provided parallel to the plurality of second direction driving electrodes provided in a row.

The mono-receiving electrode has a rounded shape including a mountain and a valley, and a first direction mono-receiving electrode bar protruding in the first direction is provided in the mountain, each of the second direction driving electrodes provided in parallel with the mono receiving electrode has a rounded shape including a mountain and a valley, and a first direction driving electrode bar protruding in the first direction is provided in the valley of each of the plurality of second direction driving electrodes, and the first direction mono-receiving electrode bar and the first direction driving electrode bar are provided adjacent to each other along the second direction.

The first direction mono-receiving electrode bar of the mono-receiving electrode protrudes toward a mountain of a second direction driving electrode adjacent to the first direction mono-receiving electrode bar, and the first direction driving electrode bar provided in a valley of the second direction driving electrode adjacent to the first direction mono-receiving electrode bar protrudes toward a valley of the mono-receiving electrode.

Each of the cross-receiving electrodes includes a second direction cross-receiving electrode extending in the second direction; and first direction cross-receiving electrodes connected to the second direction cross-receiving electrodes and extending in the first direction.

The second direction cross-receiving electrode and each of the first direction cross-receiving electrodes have a cross shape.

Each of the first direction cross-receiving electrodes includes two adjacent first direction cross-receiving electrode branches and a cross-receiving electrode bridge connecting the two first direction cross-receiving electrode branches, and the second direction cross-receiving electrode is connected to the cross-receiving electrode bridge through a contact hole formed in a bridge insulation layer covering the cross-receiving electrode bridge.

Each of the first direction cross-receiving electrodes includes two first direction cross-receiving electrodes adjacent to each other and a cross-receiving electrode bridge connecting the two first direction cross-receiving electrodes, each of the two first direction cross-receiving electrode branches has a rounded shape including a mountain and a valley, and a second direction cross-receiving electrode bar protruding in the second direction is provided in the mountain.

The second direction cross-receiving electrode has a rounded shape including a mountain and a valley.

Among second direction driving electrodes provided in driving electrodes provided in the second direction, second direction driving electrodes adjacent in the second direction are spaced apart from each other by a certain interval and are provided in a row, and the second direction cross-receiving electrode is provided in parallel with the plurality of second direction driving electrodes provided in a row.

Among the plurality of first direction cross-receiving electrodes of the plurality of cross-receiving electrodes provided in the first direction, first cross-receiving electrodes adjacent in the first direction are spaced apart from each other by a certain interval and are provided in a vertical row, and the first direction driving electrode is provided in parallel with the plurality of first direction cross-receiving electrodes provided in a vertical row.

The first direction driving electrode has a rounded shape including a mountain and a valley, and a second direction driving electrode bar protruding in the second direction is provided in the valley, each of the plurality of first direction cross-receiving electrodes provided in parallel with the first direction driving electrode has a rounded shape including a mountain and a valley, and a second direction cross-receiving electrode bar protruding in the second direction is provided in the mountain of each of the plurality of first direction cross-receiving electrodes, and the second direction driving electrode bar and the second direction cross-receiving electrode bar are provided adjacent to each other along the first direction.

The second direction driving electrode bar protrudes toward a valley of a first direction cross-receiving electrode adjacent to the second direction driving electrode bar, and a second direction cross-receiving electrode bar provided in the mountain of the first direction cross-receiving electrode adjacent to the second direction driving electrode bar protrudes toward a mountain of the first direction driving electrode.

The apparatus for sensing a stretch further comprises main pressure electrodes provided on the stretch support substrate; auxiliary pressure electrodes provided to overlap the main pressure electrodes in a third direction perpendicular to the first and second directions with an insulation layer therebetween; a plurality of main pressure electrode lines connecting main pressure electrodes provided along the first direction among the plurality of main pressure electrodes; and a plurality of auxiliary pressure electrode lines connecting the plurality of auxiliary pressure electrodes provided along the plurality of second direction among the auxiliary pressure electrodes.

A stretch substrate is provided between the stretch support substrate and the plurality of driving electrodes, the plurality of mono-receiving electrodes, and the plurality of cross-receiving electrodes, the stretch substrate includes a plurality of mesh portions connected like a mesh, a plurality of opening portions are formed between the plurality of mesh portions, and the plurality of driving electrodes, the plurality of mono-receiving electrodes, and the plurality of cross-receiving electrodes are provided in the plurality of mesh portions.

In an apparatus for sensing a stretch according to an embodiment of the present disclosure, the stretch coordinates can be accurately determined, and the stretch degree can be accurately determined.

An apparatus for sensing a stretch according to an embodiment of the present disclosure can be used as a wearable device, and a wearable device equipped with the apparatus for sensing a stretch can perform various application programs by using the stretch coordinates or the stretch degrees.

For example, when an apparatus for sensing a stretch according to an embodiment of the present disclosure is applied to a wearable device worn on the knee, wrist, and elbow of a user (e.g., firefighter, police, soldier, etc.) who is put into emergency rescue or dangerous work, the user's death or injury can be determined by analyzing the stretch degree sensed by the apparatus for sensing a stretch.

The apparatus for sensing a stretch according to aspects of the present disclosure can be applied to all electronic devices including a light emitting display panel.

For example, the apparatus for sensing a stretch according to aspects of the present disclosure can be applied to a virtual reality (VR) device, an augmented reality (AR) device, a mobile device, a video phone, a smart watch, a watch phone, or a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. An apparatus for sensing a stretch, the apparatus comprising:

a stretch support substrate configured to be stretched; and a plurality of driving electrodes, a plurality of mono-receiving electrodes, and a plurality of cross-receiving electrodes provided on the stretch support substrate, wherein each of the plurality of driving electrodes includes a first direction driving electrode extending in a first direction of the stretch support substrate, and a plurality of second direction driving electrodes connected to the first direction driving electrode and extending in a second direction different from the first direction, wherein each of the plurality of mono-receiving electrodes extends in the second direction, wherein each of the plurality of cross-receiving electrodes extends in the first direction and the second direction, wherein the first direction driving electrode includes two first direction driving electrode branches adjacent to each other and a driving electrode bridge connecting the two first direction driving electrode branches, and wherein the second direction driving electrode is connected to the driving electrode bridge through a contact hole formed in a bridge insulation layer covering the driving electrode bridge.

2. The apparatus for sensing the stretch of claim 1, wherein the first direction driving electrode and each of the plurality of second direction driving electrodes have a cross shape.

3. The apparatus for sensing the stretch of claim 1, wherein the first direction driving electrode includes two first direction driving electrode branches adjacent to each other and a driving electrode bridge connecting the two first direction driving electrode branches, each of the two first direction driving electrode branches has a rounded shape including a mountain and a valley, and a second direction driving electrode bar protruding in the second direction is provided in the valley.

4. The apparatus for sensing the stretch of claim 1, wherein each of the plurality of second direction driving electrodes has a rounded shape including a mountain and a valley, and a first direction driving electrode bar protruding in the first direction is provided in the valley.

5. The apparatus for sensing the stretch of claim 1, wherein second direction driving electrodes adjacent along the second direction among the plurality of second direction driving electrodes provided in the second direction are spaced apart from each other by a certain interval and are provided in a row, and a mono-receiving electrode is provided parallel to the plurality of second direction driving electrodes provided in a row.

6. The apparatus for sensing the stretch of claim 5, wherein the mono-receiving electrode has a rounded shape including a mountain and a valley, and a first direction mono-receiving electrode bar protruding in the first direction is provided in the mountain, each of the plurality of second direction driving electrodes provided in parallel with the mono receiving electrode has a rounded shape including a mountain and a valley, and a first direction driving electrode bar protruding in the first direction is provided in the valley of each of the plurality of second direction driving electrodes, and the first direction mono-receiving electrode bar and the first direction driving electrode bar are provided adjacent to each other along the second direction.

7. The apparatus for sensing the stretch of claim 6, wherein the first direction mono-receiving electrode bar of the mono-receiving electrode protrudes toward a mountain of a second direction driving electrode adjacent to the first direction mono-receiving electrode bar, and the first direction driving electrode bar provided in a valley of the second direction driving electrode adjacent to the first direction mono-receiving electrode bar protrudes toward a valley of the mono-receiving electrode.

8. The apparatus for sensing the stretch of claim 1, wherein each of the plurality of cross-receiving electrodes includes:

a second direction cross-receiving electrode extending in the second direction; and first direction cross-receiving electrodes connected to the second direction cross-receiving electrodes and extending in the first direction.

9. The apparatus for sensing the stretch of claim 8, wherein the second direction cross-receiving electrode and each of the first direction cross-receiving electrodes have a cross shape.

10. The apparatus for sensing the stretch of claim 8, wherein each of the first direction cross-receiving electrodes includes two adjacent first direction cross-receiving electrode branches and a cross-receiving electrode bridge connecting the two first direction cross-receiving electrode branches, and the second direction cross-receiving electrode is connected to the cross-receiving electrode bridge through a contact hole formed in a bridge insulation layer covering the cross-receiving electrode bridge.

11. The apparatus for sensing the stretch of claim 8, wherein each of the first direction cross-receiving electrodes includes two first direction cross-receiving electrodes adjacent to each other and a cross-receiving electrode bridge connecting the two first direction cross-receiving electrodes, each of the two first direction cross-receiving electrode branches has a rounded shape including a mountain and a valley, and a second direction cross-receiving electrode bar protruding in the second direction is provided in the mountain.

12. The apparatus for sensing the stretch of claim 8, wherein the second direction cross-receiving electrode has a rounded shape including a mountain and a valley.

13. The apparatus for sensing the stretch of claim 8, wherein among the plurality of second direction driving electrodes of the plurality of driving electrodes provided in the second direction, second direction driving electrodes adjacent in the second direction are spaced apart from each other by a certain interval and are provided in a row, and the second direction cross-receiving electrode is provided in parallel with the plurality of second direction driving electrodes provided in a row.

14. The apparatus for sensing the stretch of claim 8, wherein among the plurality of first direction cross-receiving electrodes provided in cross-receiving electrodes provided in the first direction, first cross-receiving electrodes adjacent in the first direction are spaced apart from each other by a certain interval and are provided in a vertical row, and the first direction driving electrode is provided in parallel with the plurality of first direction cross-receiving electrodes provided in a vertical row.

15. The apparatus for sensing the stretch of claim 14, wherein the first direction driving electrode has a rounded shape including a mountain and a valley, and a second direction driving electrode bar protruding in the second direction is provided in the valley, each of the plurality of first direction cross-receiving electrodes provided in parallel with the first direction driving electrode has a rounded shape including a mountain and a valley, and a second direction cross-receiving electrode bar protruding in the second direction is provided in the mountain of each of the plurality of first direction cross-receiving electrodes, and the second direction driving electrode bar and the second direction cross-receiving electrode bar are provided adjacent to each other along the first direction.

16. The apparatus for sensing the stretch of claim 15, wherein the second direction driving electrode bar protrudes toward a valley of a first direction cross-receiving electrode adjacent to the second direction driving electrode bar, and a second direction cross-receiving electrode bar provided in the mountain of the first direction cross-receiving electrode adjacent to the second direction driving electrode bar protrudes toward a mountain of the first direction driving electrode.

17. The apparatus for sensing the stretch of claim 1, further comprising:

a plurality of main pressure electrodes provided on the stretch support substrate;

a plurality of auxiliary pressure electrodes provided to overlap the plurality of main pressure electrodes in a third direction perpendicular to the first and second directions with an insulation layer therebetween;

a plurality of main pressure electrode lines connecting the plurality of main pressure electrodes provided along the first direction among the plurality of main pressure electrodes; and a plurality of auxiliary pressure electrode lines connecting the plurality of auxiliary pressure electrodes provided along the second direction among the plurality of auxiliary pressure electrodes.

18. An apparatus for sensing a stretch, the apparatus comprising:

a stretch support substrate configured to be stretched; and a plurality of driving electrodes, a plurality of mono-receiving electrodes, and a plurality of cross-receiving electrodes provided on the stretch support substrate, wherein each of the plurality of driving electrodes includes a first direction driving electrode extending in a first direction of the stretch support substrate, and a plurality of second direction driving electrodes connected to the first direction driving electrode and extending in a second direction different from the first direction, wherein each of the plurality of mono-receiving electrodes extends in the second direction, wherein each of the plurality of cross-receiving electrodes extends in the first direction and the second direction, and wherein each of the plurality of mono-receiving electrodes has a rounded shape including a mountain and a valley, and a first direction mono-receiving electrode bar protruding in the first direction is provided in the mountain.

19. An apparatus for sensing a stretch, the apparatus comprising:

a stretch support substrate configured to be stretched; and a plurality of driving electrodes, a plurality of mono-receiving electrodes, and a plurality of cross-receiving electrodes provided on the stretch support substrate, wherein each of the plurality of driving electrodes includes a first direction driving electrode extending in a first direction of the stretch support substrate, and a plurality of second direction driving electrodes connected to the first direction driving electrode and extending in a second direction different from the first direction, wherein each of the plurality of mono-receiving electrodes extends in the second direction, wherein each of the plurality of cross-receiving electrodes extends in the first direction and the second direction, and wherein a stretch substrate is provided between the stretch support substrate and the plurality of driving electrodes, the plurality of mono-receiving electrodes, and the plurality of cross-receiving electrodes, the stretch substrate includes a plurality of mesh portions connected like a mesh, a plurality of opening portions are formed between the plurality of mesh portions, and the plurality of driving electrodes, the plurality of mono-receiving electrodes, and the plurality of cross-receiving electrodes are provided in the plurality of mesh portions.

* * * * *